US012711696B2

(12) United States Patent
Pickard

(10) Patent No.: US 12,711,696 B2
(45) Date of Patent: Aug. 18, 2026

(54) INTERACTIVE VISUALIZATIONS FOR INDUSTRIAL INSPECTIONS

(71) Applicant: EIGEN INNOVATIONS INC., Fredericton (CA)

(72) Inventor: Joshua K. Pickard, Fredericton (CA)

(73) Assignee: EIGEN INNOVATIONS INC., Fredericton (CA)

( * ) Notice: Subject to any disclaimer, the term of this patent is extended or adjusted under 35 U.S.C. 154(b) by 52 days.

(21) Appl. No.: 18/716,773

(22) PCT Filed: Dec. 6, 2022

(86) PCT No.: PCT/CA2022/000060

§ 371 (c)(1), (2) Date: Jun. 5, 2024

(87) PCT Pub. No.: WO2023/102637

PCT Pub. Date: Jun. 15, 2023

(65) Prior Publication Data

US 2025/0292491 A1 Sep. 18, 2025

Related U.S. Application Data

(60) Provisional application No. 63/286,260, filed on Dec. 6, 2021.

(51) Int. Cl.

*G06T 15/20* (2011.01)
*G06Q 30/018* (2023.01)
*G06T 7/73* (2017.01)
*G06V 10/764* (2022.01)

(52) U.S. Cl.

CPC ......... *G06T 15/205* (2013.01); *G06Q 30/018* (2013.01); *G06T 7/75* (2017.01); *G06T 2207/10016* (2013.01); *G06T 2207/10048* (2013.01); *G06T 2207/20104* (2013.01); *G06T 2207/30108* (2013.01); *G06V 10/764* (2022.01)

(58) Field of Classification Search

CPC ....... G06T 17/00; G06T 19/006; G06T 19/20; G06T 2210/04; G06T 2219/2021

See application file for complete search history.

(56) References Cited

U.S. PATENT DOCUMENTS

2012/0303336 A1 11/2012 Becker et al.
2015/0235424 A1 8/2015 Wang et al.
2018/0197021 A1* 7/2018 Lee ...................... G06V 20/588
2018/0350055 A1 12/2018 Cardenas et al.
2019/0293609 A1* 9/2019 Oh .......................... G01S 15/89
2020/0349763 A1 11/2020 Chen et al.
2020/0410766 A1* 12/2020 Swaminathan ....... G06T 19/006
2021/0225052 A1* 7/2021 Marzorati ............... G06T 11/00

* cited by examiner

*Primary Examiner* — Ming Wu

(57) ABSTRACT

System and method that includes: receiving a 3D textured model of a part that includes inspection data collected for an industrial process associated with the part; tracking a viewing perspective of a user relative to a reference part; generating pose data based on the tracked viewing perspective; rendering an image that includes inspection data from a 3D textured model based on the generated pose data.

20 Claims, 18 Drawing Sheets

Rendered Image 166

Rendered Image 164

Blended Image 168C

Rendered RBG Image 168B

Rendered IR Image 168A

INTERACTIVE VISUALIZATIONS FOR INDUSTRIAL INSPECTIONS

RELATED APPLICATIONS

This application claims the benefit of and priority to U.S. Provisional Patent Application No. 63/286,260, filed Dec. 6, 2021, entitled "INTERACTIVE VISUALIZATIONS FOR INDUSTRIAL INSPECTIONS", the contents of which are incorporated herein by reference.

FIELD

This disclosure relates generally to imaging systems applied to industrial inspections.

BACKGROUND

The cost of quality for industrial manufacturing, particularly costs associated with inspection and prevention, can negatively impact profitability. Highly automated, high volume industrial processes require extensive amounts of information to be captured and analyzed. In this regard, industrial imaging systems, including one or more of thermal imaging systems (e.g., near-infrared (NIR) and infrared (IR) systems), optical imaging systems (e.g., Red-Green-Blue (RGB), and Hue-Intensity-Saturation (HIS), and monochrome imaging systems), hyperspectral imaging systems (HSI), and other electromagnetic (EM) wave detection based imaging systems, can be used to capture information about an industrial process for inspection and/or control purposes, and combined with machine learning systems that aid in the analysis and processing of such information.

Intelligent inspection systems can generate extensive amounts of inspection data. There is a need for effective user interface systems and methods that can enable the inspection data to be presented to a human user in a cost effective, efficient and intuitive manner.

SUMMARY

According to a first example aspect, a computer implemented method is described that includes: receiving a 3D textured model of a part that includes inspection data collected for an industrial process associated with the part; tracking a viewing perspective of a user relative to a reference part; generating pose data based on the tracked viewing perspective; rendering an image that includes inspection data from the 3D textured model based on the generated pose data.

In some example implementations, the tracking comprises receiving video image data that includes successive images of the reference part, generating the pose data comprises mapping, based on the video image data, physical locations and orientations of the reference part to a reference coordinate system that enables the inspection data from the 3D textured model to be mapped to the reference part over the successive images, and the rendering comprises successively rendering images that correspond to the successive images of the reference part.

In one or more of the preceding implementations, the reference part is a physical part having an actual geometry that may vary relative to geometry data of the 3D textured model of the part, and the method further comprises determining geometry variation data that enables the geometry data for the 3D textured model to be conformed to the actual geometry of the reference part, wherein successively rendering the images compromises is based on both the pose data and the geometry variation data.

In one or more of the preceding implementations, determining the geometry variation data comprises perturbing 3D model geometry data to determine offsets for a plurality of reference points of the 3D model geometry data to corresponding points of the reference part.

In one or more of the preceding implementations, the inspection data includes texture data corresponding to one or more of: near-infrared (NIR) image data, infrared (IR) image data, and/or visible light image data, wherein rendering the images comprises overlaying the texture data on the successive images of the reference part to provide augmented images.

In one or more of the preceding implementations, the method includes processing the inspection data collected for the industrial process associated with producing the part to visually enhance features of interest in the rendered images.

In one or more of the preceding implementations, processing the inspection data comprises using a machine learned prediction function to generate classification data for one or more regions of the part based on the inspection data, the classification data being overlaid on a representation of the part in the rendered images.

In one or more of the preceding implementations, the method includes receiving a user input selecting a region of the reference part, the rendering comprising displaying an indication of the user input.

In one or more of the preceding implementations, the inspection data includes inspection data collected from multiple industrial processes associated with producing the part, the method comprising selectively including, in the rendered image, the inspection data collected from different industrial processes, based on detected user inputs.

In one or more of the preceding implementations, (i) the tracking and the rendering uses one or more of an augmented/mixed reality headset including a head-mounted digital display and camera; (ii) the tracking and the rendering uses a mobile device including a digital display and connected camera; (iii) the tracking and the rendering uses a separate camera and digital display; or (iv) the tracking and the rendering uses a camera and digital projector; and the rendering comprises overlaying computer-generated data derived from the inspection data over physical world images of the reference part.

In one or more of the preceding implementations, the reference part is the same physical part as the part. In one or more of the preceding implementations, the reference part is a proxy object for the part.

According to a further example aspect of the present disclosure is an inspection system comprising one or more processors and one or more non-transitory memories storing software instructions that when executed by the one or more processors configure the one or more processors to perform the method of any of the preceding implementations.

According to a further example aspect of the present disclosure, an interactive inspection system is disclosed that includes: data storage storing a 3D textured model of a part that includes inspection data collected for an industrial process associated with producing the part; a tracking device configured for tracking a viewing perspective of a user relative to a reference part; a computer implemented pose estimator configured for generating pose data indicating a pose of the reference part in reliance on the tracked viewing perspective; a computer implemented rendering unit configured for generating a rendered image of the part based on the pose data, the rendered image including inspection data from the 3D textured model; and a display device configured for displaying the rendered image for the user.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

This disclosure presents systems and methods that enable interactive real-time visualizations of inspection data that is captured in respect of manufactured parts. As used herein, the term "part" refers to a component or element that is produced by an industrial process.

Figure 1:
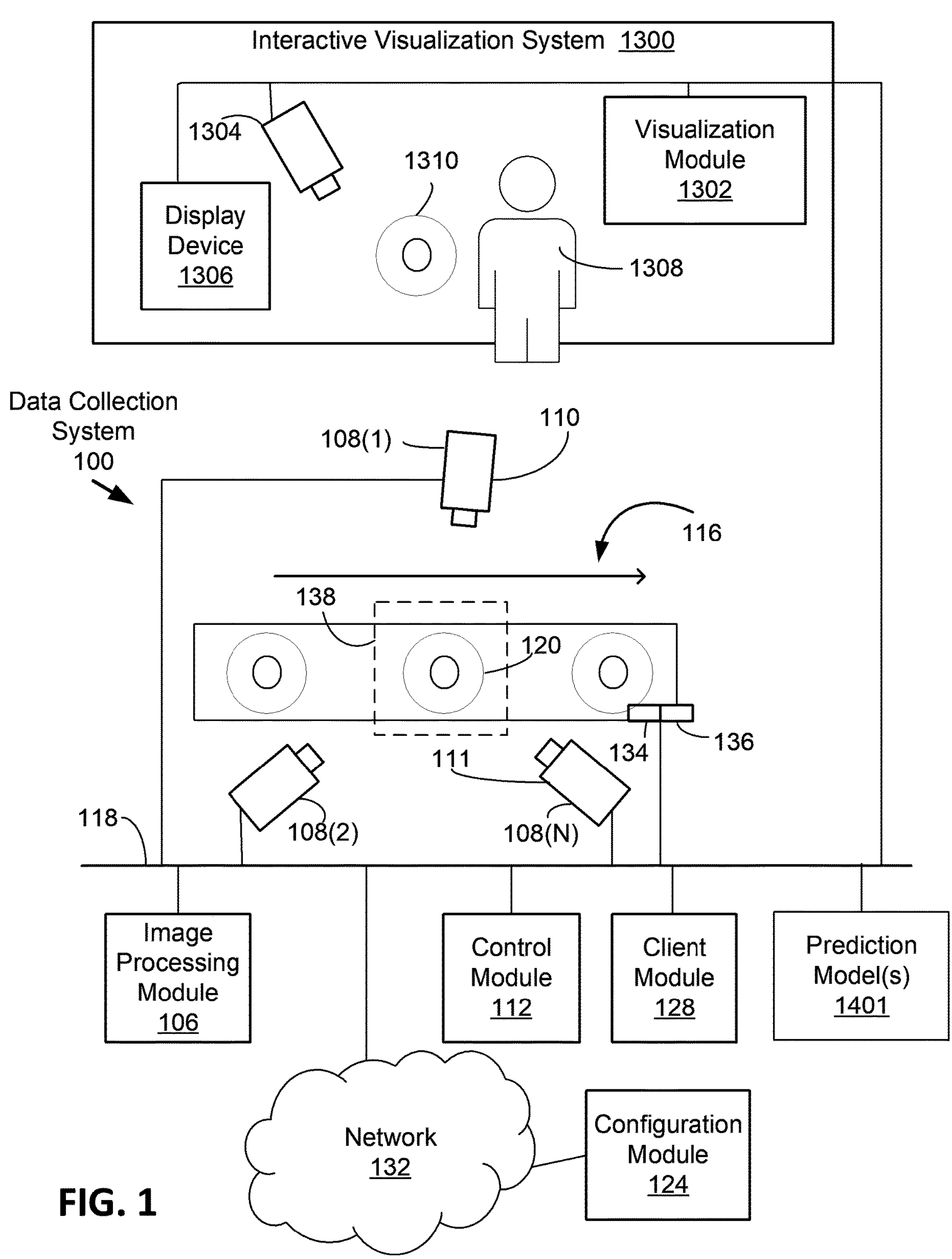
FIG. 1 is a block diagram illustrating an inspection data collection system and an interactive visualization system according to example embodiments.
Figure 11:
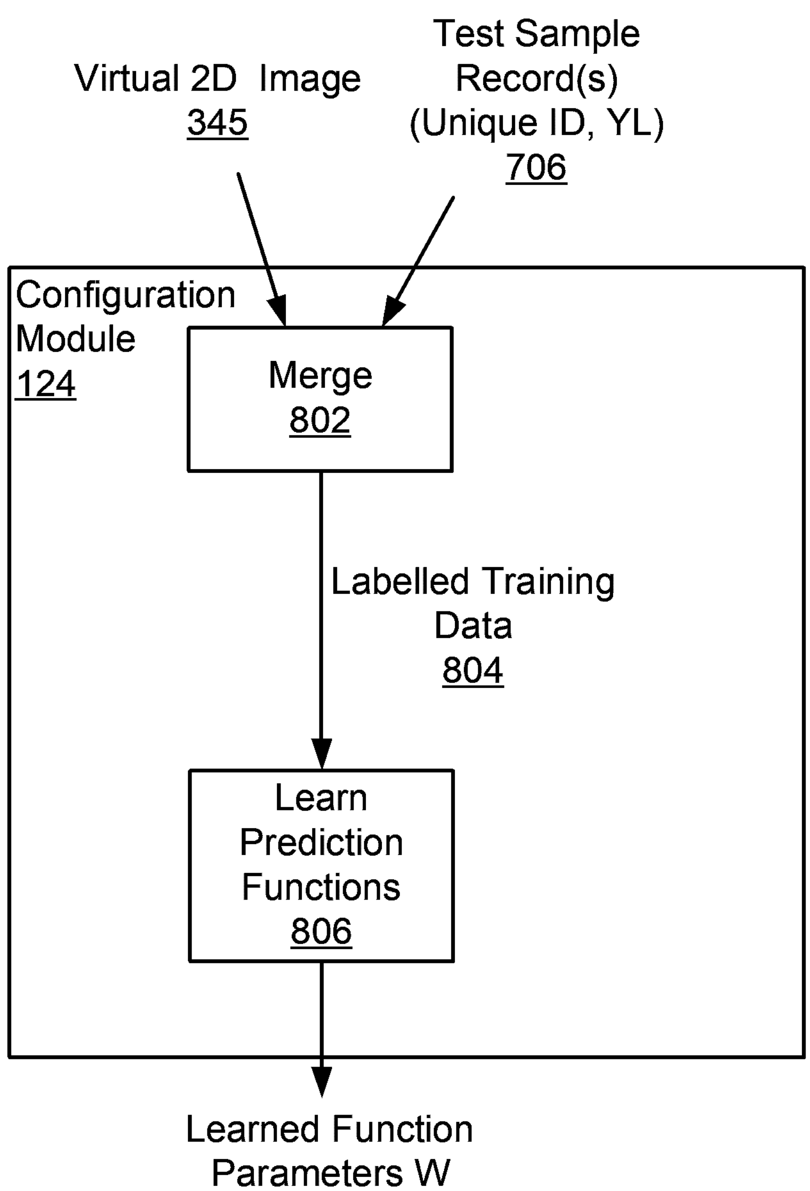
FIG. 11 is a block diagram of an ML model training operation performed by a configuration module of the system of FIG. 1.
Figure 12:
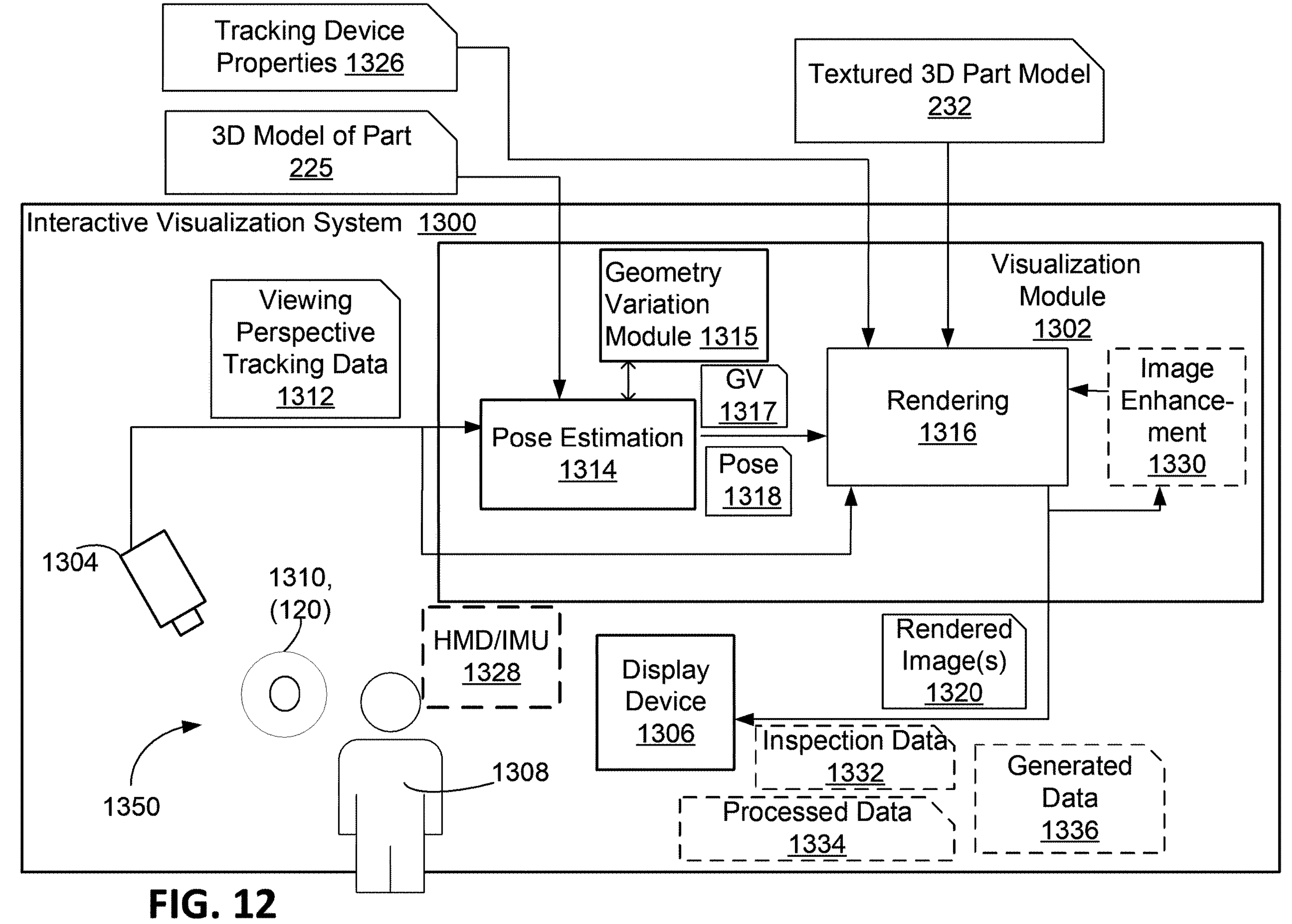
FIG. 12 is a block diagram illustrating components of the interactive visualization system of FIG. 1.

FIG. 1 illustrates an inspection data collection system 100 and a cooperating interactive visualization system 1300. Inspection data collection system 100, which is described in greater detail with reference to FIGS. 1 to 11 below, applies image analysis techniques that can be used as part of inspection and process control tasks related to industrial processes such as manufacturing processes. FIG. 12 and onwards disclose an interactive visualization system 1300 that can be integrated with the data collection system 100 of FIGS. 1 to 11 to perform interactive real-time visualizations of inspection data that is captured in respect of manufactured components.

Inspection Data Collection System 100

Regarding the inspection data collection system 100 of FIGS. 1 to 11, many manufacturing processes repeatedly mass-produce specific parts with known geometries (i.e., digital 3D models have been created for the manufactured parts). Typically, a manufactured part will be intended to have an expected pose (i.e., a known 3D position and 3D orientation) with respect to an image sensing device (e.g., a camera) at the time that an image of the part is captured by the image sensing device. However, the actual pose of the manufactured part can frequently vary from the expected pose. In example embodiments, real image data of a manufactured part can be combined with 3D model data for the part to estimate an optimal pose for the manufactured part. This can enable variability in the part pose to be automatically managed and can also eliminate unwanted data, such as image backgrounds, by mapping image data of the captured object as textures onto the 3D model. Texture mapping involves mapping inspection data of a physical part, captured by various types of imaging sensors (e.g., color, monochrome, near-infrared, infrared, and hyperspectral imaging sensor devices), onto the surface of a corresponding 3D model. The inspection data takes the form of captured texture images, with pixel values of the images providing texture data. This connects the image pixel data to spatial 3D model data and allows for various virtual viewpoints of the part, as seen from a virtual camera, to be rendered by an arbitrary virtual rendering unit. In at least some applications, this normalizes the image data and better conditions the images for machine learning as the unwanted data variabilities (e.g., part pose and imaging sensor device pose variations, background variations, etc.) can be removed from the image datasets. In some cases, the manual process of labelling images for training purposes is also simplified since the user is able to compare and label normalized image data. This has been seen to significantly improve labelling times and accuracy. This also improves the performance of anomaly detection and other analytics algorithms.

The data collection system 100 of FIG. 1 is configured to generate textured 3D models of manufactured parts. As used here, "textured 3D model" can refer to a data structure that comprises a mapping of inspection data (e.g., image data) collected in respect of a manufactured part to corresponding surfaces of a 3D model representation of the part. The collected image data (referred to as inspection data) provides a texture for the surfaces of the 3D model representation of the part. In example embodiments, the elements of system 100 include one or more imaging sensor devices 108(1) to 108(N) (reference 108 is used to denote a generic individual imaging sensor device 108 in this disclosure), image processing module 106, control module 112, configuration module 124 and client module 128. As used here, the terms "module" and "unit" can refer to a combination of a hardware processing circuit and machine-readable instructions and data (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

In example embodiments, imaging sensor devices 108(1) to 108(N), image processing module 106, control module 112 and client module 128 may be located at an industrial process location or site and enabled to communicate with an enterprise or local communications network 118 that includes wireless links (e.g. a wireless local area network such as WI-FI™ or personal area network such as Bluetooth™), wired links (e.g. Ethernet, universal serial bus, network switching parts, and/or routers, or a combination of wireless and wireless communication links. In example embodiments, configuration module 124 may be located at a geographic location remote from the industrial process location and connected to local communications network 118 through a further external network 132 that may include wireless links, wired links, or a combination of wireless and wireless communication links. External network 132 may include the Internet. In some examples, one or more of control module 112, image processing module 106, control module 112, and client module 128 may alternatively be distributed among one or more geographic locations remote from the industrial process location and connected to the remaining modules through external network 132. In some examples, configuration module 124 may be located at the industrial process location and directly connected to local communications network 118.

In some examples, control module 112, image processing module 106, configuration module 124 and client module 128 may be implemented using a suitably configured processor enabled computer devices or systems such as personal computers, industrial computers, laptop computers, computer servers and programmable logic controllers. In some examples, individual modules may be implemented using a dedicated processor enabled computer device, in some examples multiple modules may be implemented using a common processor enabled computer device, and in some examples the functions of individual modules may be distributed among multiple processor enabled computer devices. Further information regarding example processor enabled computer device configurations will be described below.

In example embodiments, imaging sensor devices 108(1) to 108(N) can include one or more types of imaging sensor devices including thermal image cameras and optical image cameras. For example, one or more of the imaging sensor devices 108(1) to 108(N) may be a thermal image camera 111 that is a processor enabled device configured to capture thermal data by measuring emitted infrared (IR) or near infrared (NIR) radiation from a scene and calculate surface temperature of one or more objects of interest within the scene based on the measured radiation. Each thermal image camera 111 can be configured to generate a structured data output in the form of a thermal image that includes a two-dimensional (2D) array (X, Y) of temperature values. The temperature values each represent a respective temperature calculated based on radiation measured from a corresponding point or location of an observed scene. Thus, each thermal image includes spatial information based on the location of temperature values in the elements (referred to as pixels) of the 2D array and temperature information in the form of the temperature value magnitudes. By way of non-limiting example, each thermal image may have a resolution of X=320 by Y=256 pixels that are each assigned a respective calculated temperature value, although other resolutions can alternatively be used. Each thermal image camera 111 may generate several thermal images (also referred to as frames) per second. By way of non-limiting example, each thermal image camera 111 may scan 60 frames per second, with each frame being an X by Y array of temperature values, although other frame rates may also be used. In some examples, the calculated temperature values included in a thermal image may be a floating point temperature value such as a value in degrees Kelvin or Celsius. In some examples, each pixel in a thermal image may map to a desired color palette or include a respective color value (for example an RGB color value) that can be used by a display device to visually represent measured thermal data.

In some examples, one or more of imaging sensor devices 108(1) to 108(N) can be an optical image camera 110 configured to capture a representation of visible light reflected from a scene that can include one or more objects of interest. Each optical image camera 110 can be configured to generate a structured data output in the form of an optical image that includes two-dimensional (2D) image data arranged as an (X, Y) array of picture elements (e.g., pixels), where each array element represents an optical image data value such as a color value. Each array element may have multiple depths or channels, with each depth representing a respective color value (e.g., Red-Green-Blue (RGB) values in the case of an RGB format, or Hue-Intensity-Saturation (HIS) in the case of an HIS format). In some examples, optical image camera 110 may be a monochrome image sensing device or a grayscale image sensing device. The pixel values included in the optical image data each represent respective visible light properties calculated based on reflected light from a corresponding point or location of an observed scene. Thus, each optical image frame includes geospatial information based on the location of the values in the pixels of the 2D array, and optical data. Each optical image camera 110 may be configured to generate several optical images (also referred to as frames) per second, with each frame being an X by Y array of optical data values.

In example embodiments, imaging sensor devices 108(1) to 108(N) are arranged to capture a scene that includes at least one part 120 (e.g., a manufactured part 120 that is produced as one of a sequence of identical parts in an industrial process 116) such that the images captured by sensor devices 108(1) to 108(N) includes image data about the manufactured part 120.

In example embodiments, image processing module 106 is configured to receive image data from imaging sensor devices 108(1) to 108(N) about the part 120 in the form of thermal images from one or more thermal image cameras 111, and/or optical images from one or more optical image cameras 110. Each thermal image provides a set of 2D pixel-level thermal texture data for the part 120, and each optical image provides a set of 2D pixel-level optical texture data for the part 120.

As will be explained in greater detail below, image processing module 106 is configured to generate respective mappings of the 2D texture data included in images collected by imaging sensor devices 108(1) to 108(N) to a 3D model for the part 120. The respective mappings can then be used to generate rendered image data that can represent multiple views, or one or more processed views of the part.

Control module 112 is configured to receive rendered image data from image processing module 106, process the received rendered image data, and take actions based on such processing. In some examples, the actions may include an inspection decision, such as classifying the part 120 as passing or failing a quality standard. In some examples, the actions may include generating control instructions for one or more industrial processes 116 that are part of the system 100. In some examples, the control instructions may include instructing process control unit 136 to physically route a manufactured part 120 based on a classification (e.g., "pass" or "fail") determined for the part 120.

In some examples, control module 112 may include one or more trained machine learning (ML) based models that are configured to perform the processing of the rendered image data.

In some examples, configuration module 124 is configured to receive data, including one or both of texture mapping data and rendered image data, from image processing module 106 and other sources and provide configuration information to control module 112 based on such data. For example, configuration module 124 may be configured to apply learning algorithms based on rendered image data in respect of multiple historic parts 120 to train or update ML based models that can then be deployed to control module 112 for use in a real-time industrial process.

In example embodiments, configuration module 124 may receive data from several image processing modules 106 and use the combined data to generate configuration information for a plurality of image control modules 104.

Client module 128 may be configured to allow users at the industrial process location to interact with the other modules and parts of system 100.

The configuration and operation of system 100 will now be described in greater detail in accordance with example embodiments. System 100 can be used to collect and process inspection data for any industrial process, including for example an injection molding process, a hot plate welding process, a painting process, and a visual inspection process. In one example, the industrial process 116 is a data collection process in which successive identical manufactured parts 120 are automatically inspected for defects as they pass through an automated inspection station 138. Imaging sensor devices 108(1) to 108(N) are positioned to capture respective images of part 120 at automated inspection station 138. In example embodiments, multiple imaging sensor devices of the same type may be used as (e.g., two thermal image cameras 111, and two optical image cameras 110) as some of the devices may have partly obstructed views of surface region. In example embodiments, thermal image cameras 111 may be pre-calibrated to focus on IR emissions from certain regions within a scene and/or within specified magnitude thresholds in order to filter extraneous information from the captured thermal images.

Part 120 may be associated with a unique identifier that enables the part 120 to be tracked through industrial process 116. For example, part 120 could have a unique part identifier (ID) that is applied to a machine readable label (e.g. barcode or RFID tag) that can be read by a process sensor 134. The part ID may also include a model or part identifier and other information. In some examples, the part ID for a part 120 may be assigned and tracked based on the location of the part within a sequence of manufactured parts, rather than as a physical label.

In example embodiments, the location and orientation of each of imaging sensor devices 108(1) to 108(N) is fixed and known relative to inspection station 138. Industrial process 116 is configured such that the part 120 will have an expected pose relative to each of the imaging sensor devices 108(1) to 108(N), when the part is present at the inspection station 138. In this disclosure, the expected pose of the part at the time that an image is captured by a respective imaging sensor device 108 can be referred to as an "initial pose" for that imaging sensor device 108 and includes 6 dimension spatial data that defines the expected 3-dimensional position and 3-dimensional orientation of the part 120 relative to a reference point of that specific imaging sensor device 108. For example, the initial pose can include an expected part orientation (e.g. for example pitch, yaw and roll of the part) and location (e.g. X, Y, Z Cartesian location) of a reference point of the manufactured part 120 relative to a reference point of the respective imaging sensor device 108. In at least some example applications, the actual pose of the part 120 relative to an imaging sensor device 108 may vary from the expected "initial pose" due to uncertainties and disturbances inherent in the industrial process. As will be described below, image processing module 106 is configured to process image data from each of the imaging sensor devices 108(1) to 108(N) to mitigate the effects of variations in the actual part pose from the initial pose, as well as for other variations in image data collection that can result from variations in the properties of individual imaging sensor devices 108. For example, imaging sensor devices 108 can have varying imaging properties such as focal length, field of view, principle point, lens artifacts (e.g., lens distortion), etc. that can affect collected image data.

The processing of image data from a representative imaging sensor device 108 in respect of a target part 120 by image processing module 106 will now be described with reference to FIG. 2, which is a block diagram of a pipeline of image processing and rendering operations performed by image processing module 106 according to example embodiments. The processing and rendering operations performed by image processing module 106 can be applied to various types of image data, including for thermal image data and optical image data, and accordingly the operation for image processing module 106 will be described in the context of arbitrary image data in which an image is represented as a matrix of image pixel values corresponding to a scene that includes part 120 and a background (e.g., image data that does not map to a surface of the part).

Figure 2:
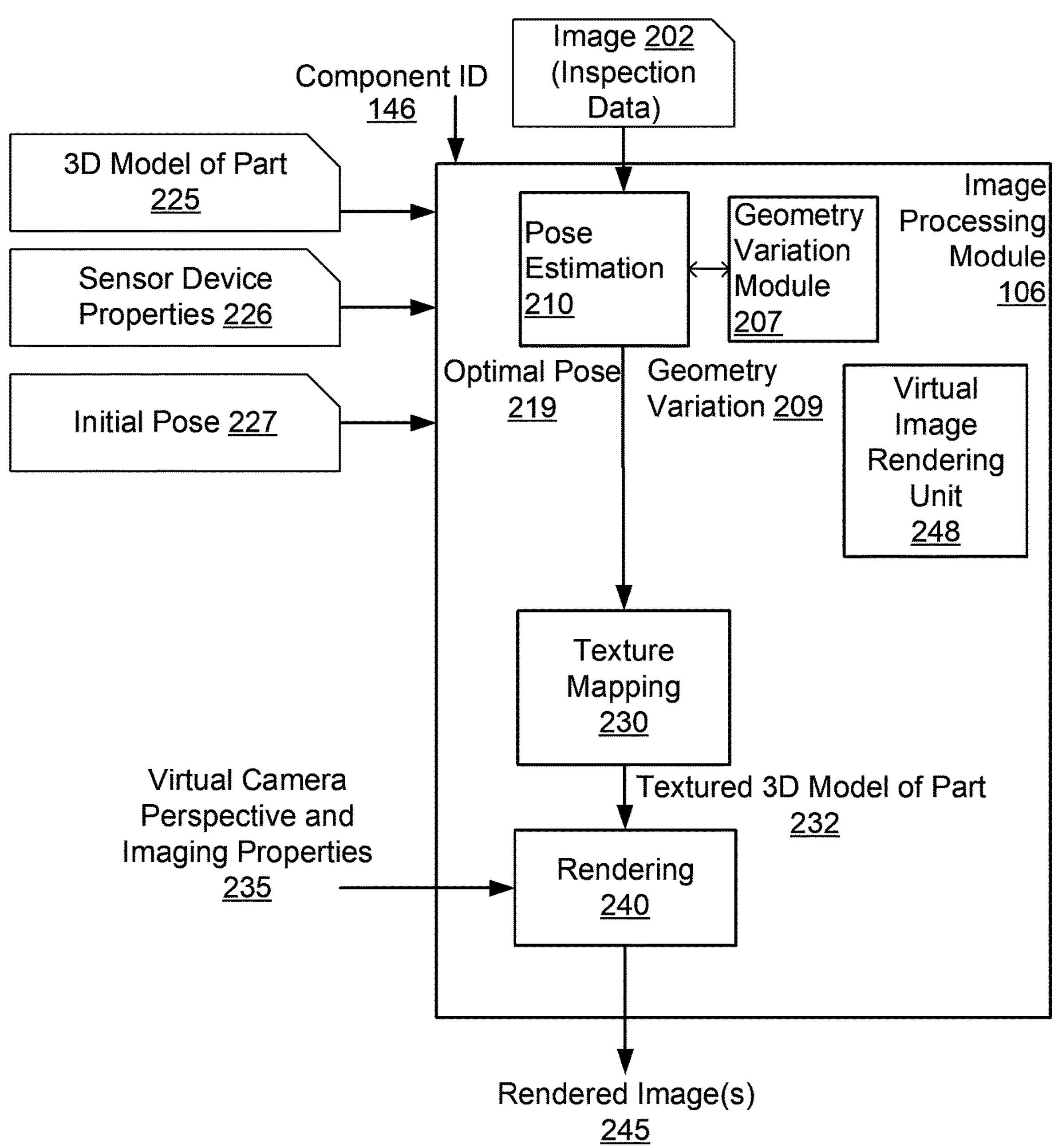
FIG. 2 is a block diagram of procedures performed by an image processing module of the system of FIG. 1.

As indicated in FIG. 2, in an illustrated example, image processing module 106 can receive the following input data:

(1) Image 202: Image 202 is the pixel image data generated by the image sensing device 108 in respect of manufactured part 120 and the image background. Images 202 correspond to raw inspection data.

Figure 3:
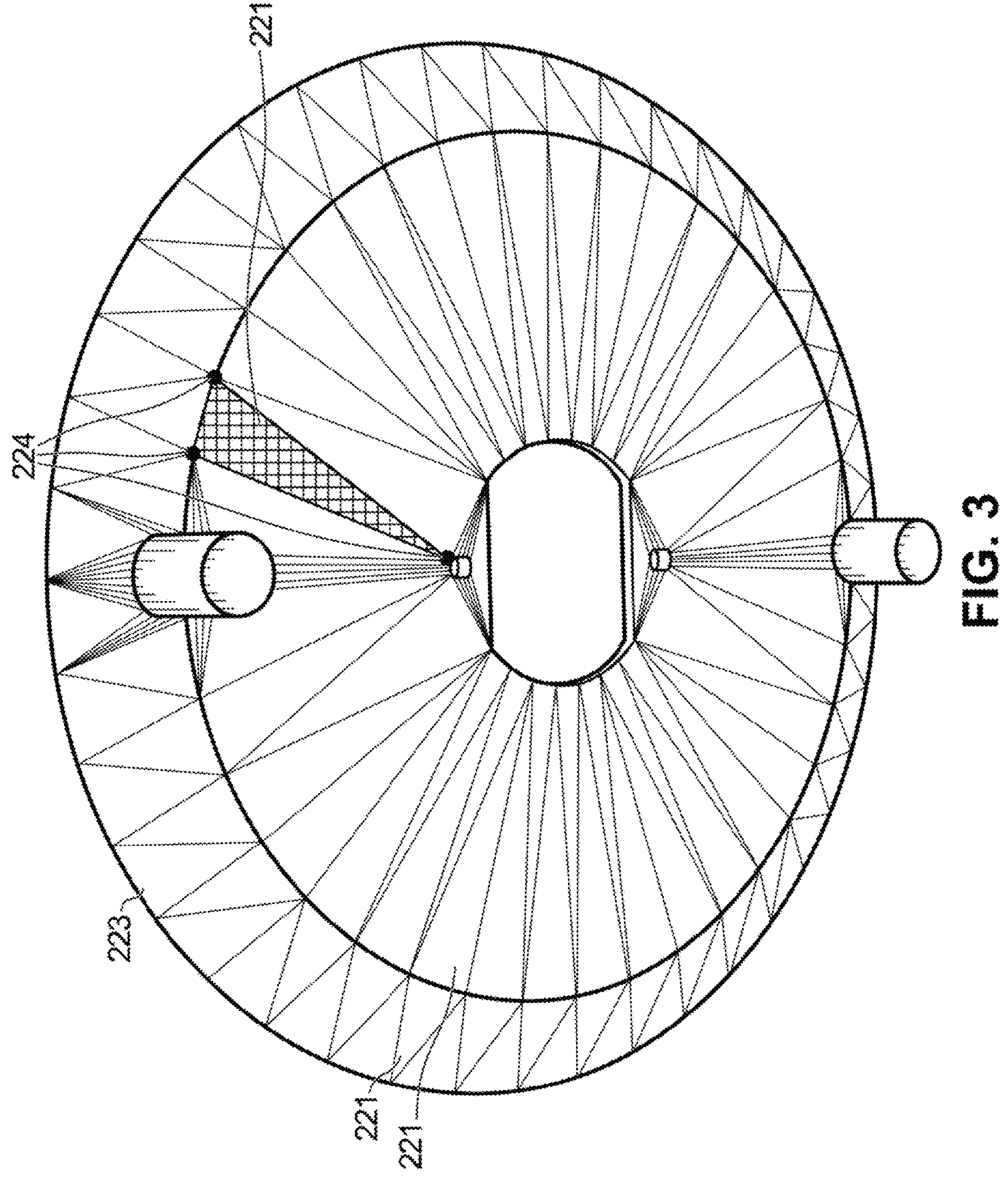
FIG. 3 is an illustration of a textured polygonal mesh of a sample part that defines facets and vertices of the textured polygonal mesh.

(2) 3D part model 225: 3D part model 225 is a dataset that can be derived from computer aided design (CAD) representation of part 120 as it is intended to be manufactured. In this disclosure, the intended part represented in the 3D part model 225 is referred to as the model part, and an inspection objective of the industrial process is to determine if the manufactured part 120 conforms satisfactorily within acceptable manufacturing tolerances to the model part. In an example embodiment, the 3D model 225 is a mesh model that represents 3D physical surfaces as a set of polygonal surfaces that are each defined by a respective set of vertices. In the illustrated example, each polygonal surface (referred to in this disclosure as a facet) is a triangle defined by three vertices, although other facet shapes can be used in other embodiments. By way of reference, FIG. 3 illustrates a 3D part mesh model 225 as a set of triangular facets 221 that approximate a model part 223 that represents the intended structure of manufactured part 120. The vertices 224 that define one of the facets 221 are illustrated. The 3D coordinates of all of the facet vertices are defined in the 3D part model 225. By way of example, 3D part model 225 may comprise a dataset that is arranged in a polygon file format (PLY), which is a known file format for storing graphical objects that are described as a collection of polygons. A typical PLY object definition is a list of (x, y, z) triples for vertices and a list of facets that are described by indices into the list of vertices. Additional properties can be attached to the elements (e.g., vertices and faces) of an object (where the object in the present case is the model part).

(3) Imaging sensor Device Properties 226: Imaging sensor Device Properties 226 can include metadata about the imaging sensor device 108 such as focal length, field of view, principle point, image resolution and size in pixels, known lens artifacts, etc., that can affect collected image data.

(4) Initial pose data 227: As discussed above, initial pose data 227 indicates an expected pose (initial pose) of the target 120 relative to the imaging sensor device 108.

In example embodiments, image processing module 106 is also provided with the part ID 146 for the manufactured part 120 that is represented in the image 202.

As indicated in FIG. 2, image processing module 106 either includes or has access to a virtual image rendering unit 248 (e.g., a virtual camera model). Virtual image rendering unit 248 can function as a computer implemented model of an image sensing device (for example, as a model of image sensing device 108 that captured image 202) and is configured to render virtual images of a part from the perspective of an input pose (for example the initial pose 227) and input sensor device properties (for example sensor device properties 226) based on the 3D part model 225. In example embodiments, the format of virtual images can be specified (for example, thermal image, optical image, depth image, etc., as well as image size and resolution).

Image processing module 106 includes a pose estimation procedure 210. Pose estimation procedure 210 performs a localization routine to determine the optimal part pose 219 and the associated transformation data that can be used to transform and project the 3D model part 225 to match the actual pose of manufactured part 120 in the image 202. Pose estimation operation 210 can be performed in a number of different ways. An illustrative example will be described with reference to FIGS. 4, 5 and 6. As used herein, the term "procedure" can refer to a set of one or more operations that are performed by one or more processor units that are configured by a set of executable software or firmware instructions.

Figure 4:
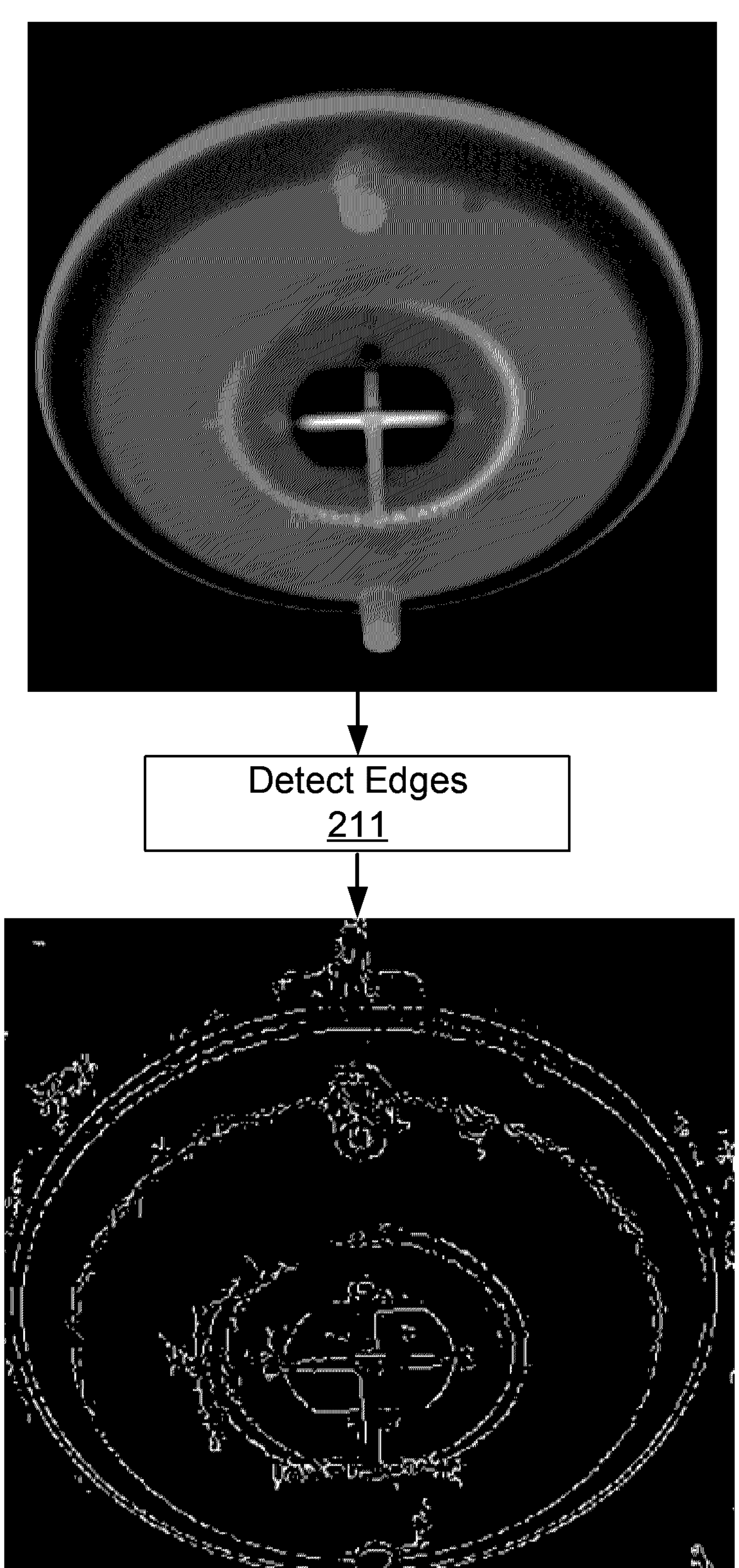
FIG. 4 illustrates an image edge detection operation performed as part of a pose estimation procedure of the image processing module of FIG. 2.

As indicated in FIG. 4, pose estimation procedure 210 includes an image edge detection operation 211 in which the 2D edges of the manufactured part 120 are extracted from the image 202 to generate a corresponding 2D part edge image 212. Part edge image 212 is a pixel representation of the image 202 in which structural edges of the manufactured part 120 are represented and other image data is absent, thereby drastically reducing the amount of image data. Edge detection can allow various different image formats from different types of sensor image device types to be processed by the image processing module 106. Image edges are identifiable under various illumination conditions and on many textureless industrial parts.

A variety of known edge detection techniques can be applied to implement image edge detection operation 211, including for example the multi-stage Canny edge detector algorithm.

Figure 5:
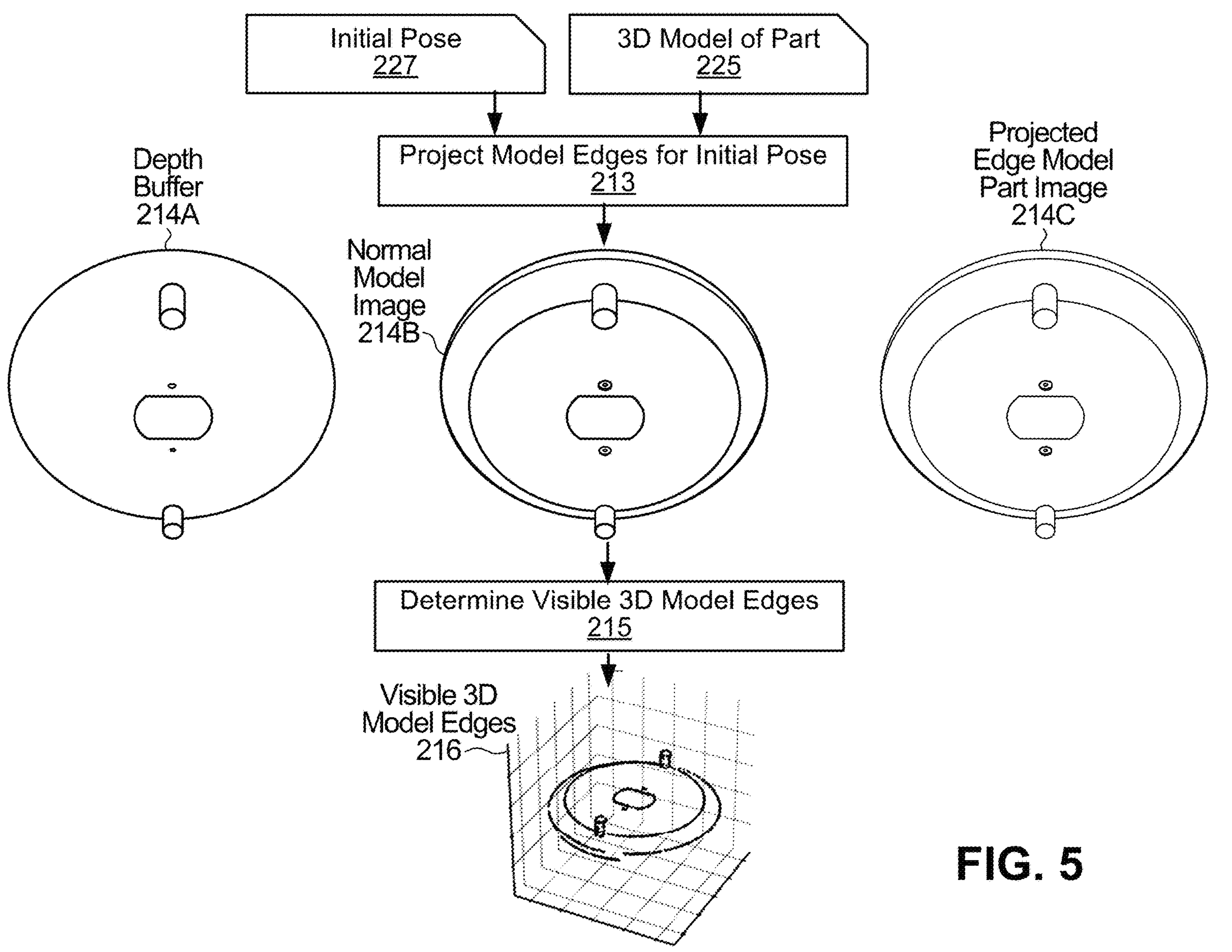
FIG. 5 illustrates a 3D model edge projection operation performed as part of the pose estimation procedure of the image processing module of FIG. 2.

With reference to FIG. 5, pose estimation procedure 210 also includes a model edge projection operation 213 that processes the initial pose data 117 and the 3D part model 225 to render a 2D projected edge model part image 214C that represents the model part in the initial pose. In an illustrative example, model edge projection operation 213 may include the following steps:

(1) Use virtual image rendering unit 248 to render a virtual depth buffer image 214A of the model part for the initial pose. As known in the art, a depth buffer image represents the relative distances of surfaces included in an image relative to particular perspective by assigning different Z-values to image pixel locations.

(2) Use virtual image rendering unit 248 to render a normal map model image 214B of the model part for the initial pose. Normal map image 214B may include normal image pixel data that corresponds to the same image format used for the manufactured part image 202.

(3) Perform edge detection on each of the depth buffer image 214A and the normal map model image 214B using an edge detection algorithm (e.g., Canny edge detection) to determine 2D projected edge images for both the depth buffer image 214A and the normal map model image 214B.

(4) Combine the 2D projected edge images to generate 2D-projected edge model part image 214C that corresponds to the initial pose.

In example embodiments, the renderings of one or both of the depth buffer image 214A and normal map model image 214B are based on the sensor device properties 226, thereby allowing actual camera properties (e.g., lens artifacts such as lens distortion) to be accounted for.

As indicated in FIG. 5, pose estimation procedure 210 also includes an operation 215 to determine the visible 3D model edges for the initial pose. In this regard, the rendered 2D projected edge model part image 214C and the depth buffer image 214A are processed to un-project the 2D model edges and compute an approximation of the model edges that are visible in a 3D representation of the model part. The resulting visible 3D model edge image dataset 216 is illustrated in FIG. 5.

Accordingly, operations 213 and 215 collectively compute and project 3D model part edges for the initial pose using a rendering-based approach that may accurately identify the edges of the model, including for example curved surfaces (e.g., the projecting cylinders in the illustrated example part). During the operations, the 3D model edges inherent in the 3D part model 225 are projected onto the 2D imaging plane, accounting for the properties of the actual imaging sensor device 108. Appropriate sensor device lens artifacts are considered (e.g., lens distortions). In at least some examples, this can enable the 3D model edges included in the visible 3D model edge dataset 216 to be directly compared with the edges of the manufactured part 120 in the projected edge image 212 in order to accurately estimate part pose.

Figure 6:
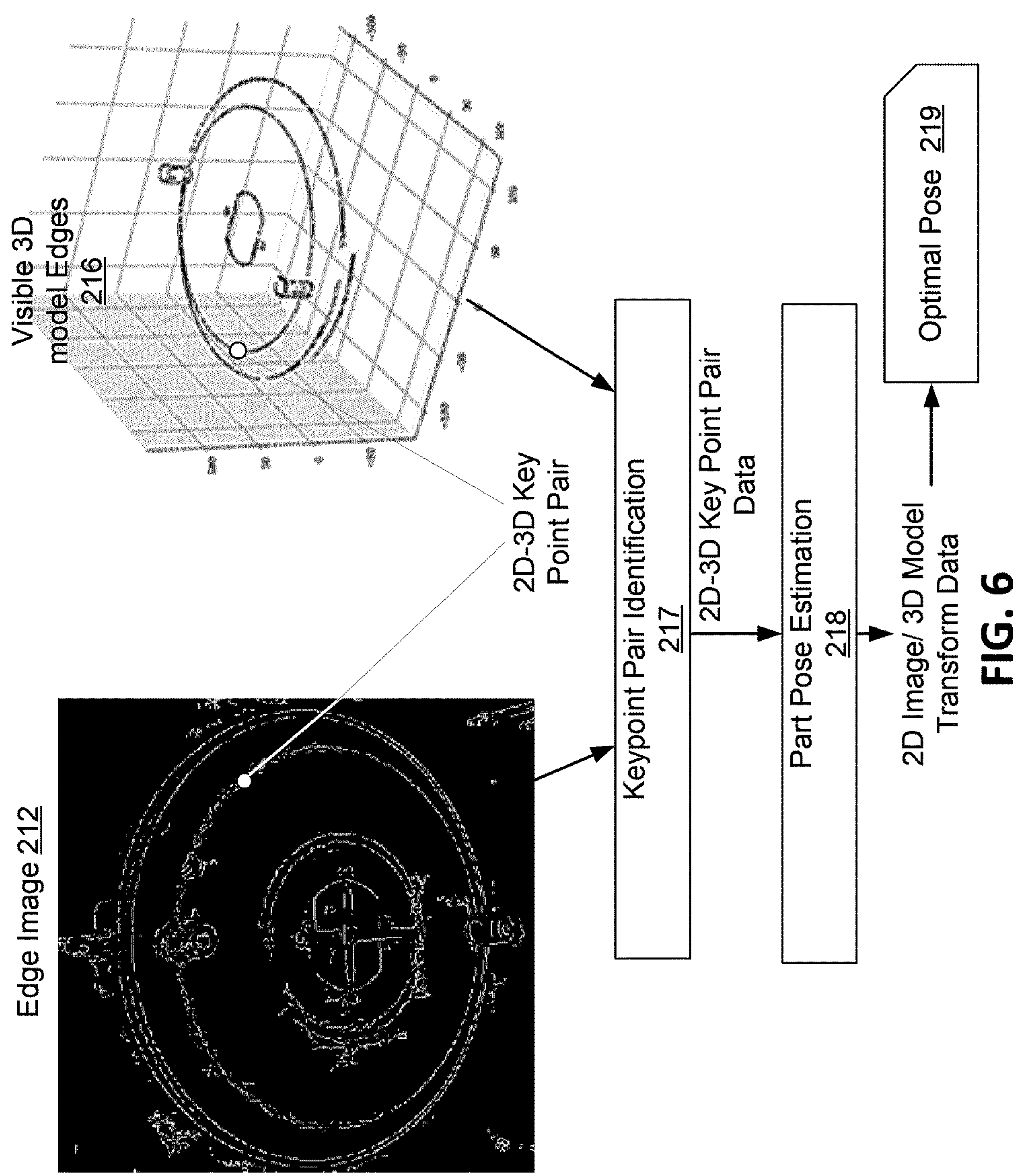
FIG. 6 illustrates a part pose estimation operation performed as part of the pose estimation procedure of the image processing module of FIG. 2.

Referring to FIG. 6, pose estimation procedure 210 includes a keypoint pair identification operation 217 and a part pose estimation operation 218. Keypoint pair identification operation 217 identifies a set of corresponding keypoint pairs that maps edge points in the 2D edge image 212 of the manufactured part 120 to corresponding edge points in the visible 3D model edge dataset 216. The set of corresponding keypoint pairs are then used by part pose estimation operation 218 to estimate the actual pose of manufactured part 120 in the image 202 relative to the initial pose and determine 2D image/3D model transform data that can be used to determine an optimal pose 219. In some examples, part pose estimation operation 218 can apply a Perspective-n-Point (PnP) pose algorithm to solve the problem of estimating the 6D relative pose—3D position and 3D orientation—between a calibrated perspective camera (e.g., image capture device 108) and a 3D object (e.g., manufactured part 120) from a set of n visible 3D points with known (X, Y, Z) object (or scene) coordinates (e.g., visible 3D model edge dataset 216) and their 2D projections with known (u, v) pixel coordinates (e.g., 2D edge image 212). In some examples, outlier data can be removed using a RANdom SAmple Consensus (RANSAC) algorithm.

In some scenarios, the 3D part model 225 may not match the geometry of the part 120 and the pose estimation 210 can return incorrect values. Accordingly, image processing module 106 can include a geometry variation module 207 that is leveraged during pose estimation procedure 210 to perturb the geometry of the 3D part model 225 so that it matches the part 120 in the inspection data image 202. Pose estimation module outputs optimal pose 219 and geometry variation data 209. The geometry variation data 209 can be represented as offsets to the vertex coordinates of the original 3D model 225.

Once calculated, the relative pose definition can be used to determine an optimal pose 219 that accurately maps the visible 3D model edge dataset 216 to the 2D edge image 212.

Figure 7:
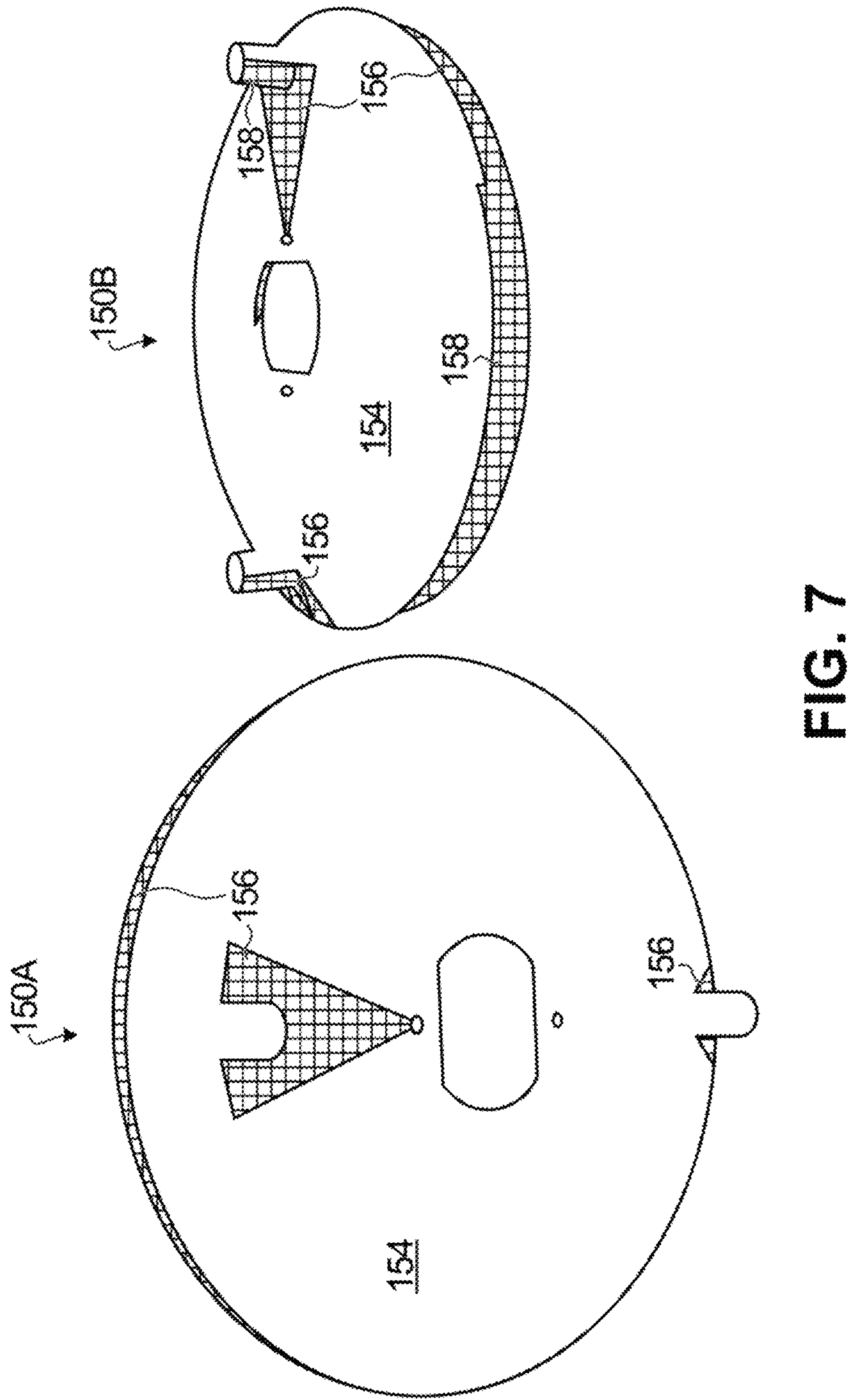
FIG. 7 shows model images illustrating visible, partly visible, and non-visible facet regions of a sample part.

By way of illustration, FIG. 7 illustrates a virtual image rendering 150A of a model part using the optimal pose 219 that describes facet visibility. Surface region 154 consists of facets that are classified as "visible" and surface regions 156 each consist of facets that are classified as "partly visible". FIG. 7 also illustrates a further virtual image rendering 150B from a different arbitrary camera perspective other than the optimal pose 219, but which retains the facet visibility classifications of the optimal pose 219. In rendering 150B, surface region 154 consists of facets that have been classified as "visible", surface regions 156 each consist of facets that have been classified as "partly visible" and surface regions 158 each consist of facets that have been classified as "non-visible".

The facet visibility classification defines (i) a list of facets 221 of the 3D model part 225 that have been classified as "visible" and are unoccluded, (ii) a list of facets 221 of the 3D model part 225 that are classified as "partly visible", and are partially occluded, and (iii) a list of facets 221 of the 3D model part 225 that are classified as "non visible" and are fully occluded, from an image sensing device perspective that corresponds to the optimal pose 219.

Referring again to FIG. 2, image processing module 106 includes a texture mapping procedure 230 that is configured to map texture data (for example, pixel values) included in the actual part image 202 to the facets 221 of the model part. In this regard, the texture mapping procedure 230 is configured to apply the 2D image/3D model transform data, optimal pose 219 and geometry variation 209 that was computed by pose estimation procedure 210 and geometry variation module 207 to map the texture information included in the image pixels of image 202 to each facet 221.

Based on the optimal pose 219 and the list of facets, a set of texture coordinates is computed for each facet that maps a corresponding group of pixels included in the image 202 to the facet. For example, in the case of a triangular facet, each set of (X, Y, Z) vertex coordinates of the facet are mapped to a respective (u, v) pixel coordinate as viewed according to the optimal pose 219. In example embodiments, the 3D model part 225 can be modified so that the 2D pixel coordinates mapped to each vertex are attached as properties to each vertex in a textured 3D part model 232.

In an example embodiment, the texture mapping procedure also attaches the sensor device properties 226, optimal pose 219, and geometry variation 209 as rendering properties in a textured 3D part model 232 that are used during the rendering procedure 240 to visualize data occlusions on the surface of the textured 3D part model 232 according to the facet visibility classifications.

The geometry variation 209 is used by the texture mapping procedure 230 to ensure the correct texture coordinates are assigned to each vertex when the 3D part model 225 does not match the geometry of the part 120. The geometry variation 209 modifies the texture coordinates that would have otherwise been returned for the original 3D part model 225. The textured 3D part model 232 retains the same geometry as 3D part model 225 (i.e., the vertex data is unchanged). This ensures that the inspection data 202 is properly mapped onto the original geometry of 3D part model 225.

Accordingly, the textured 3D part model 232 provides a model representation of manufactured part 120 that has been adjusted to represent the optimal pose and, in at least some cases, imaging properties of the particular image sensing device 120 such as lens artifacts (which may for example be detected during an initial system configuration and setup). In at least some examples lens artifacts may be variable based on time and/or environmental. For example, humidity and temperature may rise later in the day, affecting lens distortion.

The image processing module 106 further includes a rendering procedure 240 that can receive as input the textured 3D part model 232, the sensor device properties 226, the optimal pose 219, a virtual camera perspective that can be different than that of the optimal pose 219, and also camera imaging properties (e.g. resolution, focal length, etc.) that can be different than those of the image sensing device 108 used to capture image 202.

Rendering procedure 240 applies a two stage rendering process to render the textured 3D part model 232 while also accounting for the data occlusions on the surface:

- Stage (I)—the textured 3D part model 232 is first rendered using the sensor device properties 226 and the optimal pose 219 to generate an associated depth buffer that will be used for shadow mapping.
- Stage (II)—the previous depth buffer is passed to a new rendering where the textured 3D part model 232 is rendered using the virtual camera perspective and imaging properties 235. During shading, the value of each pixel in the current depth buffer is compared to an associated pixel in the previous depth buffer and texture data is mapped to the pixel when the current depth buffer pixel is lower, thereby providing shadow mapping.

Figure 8:
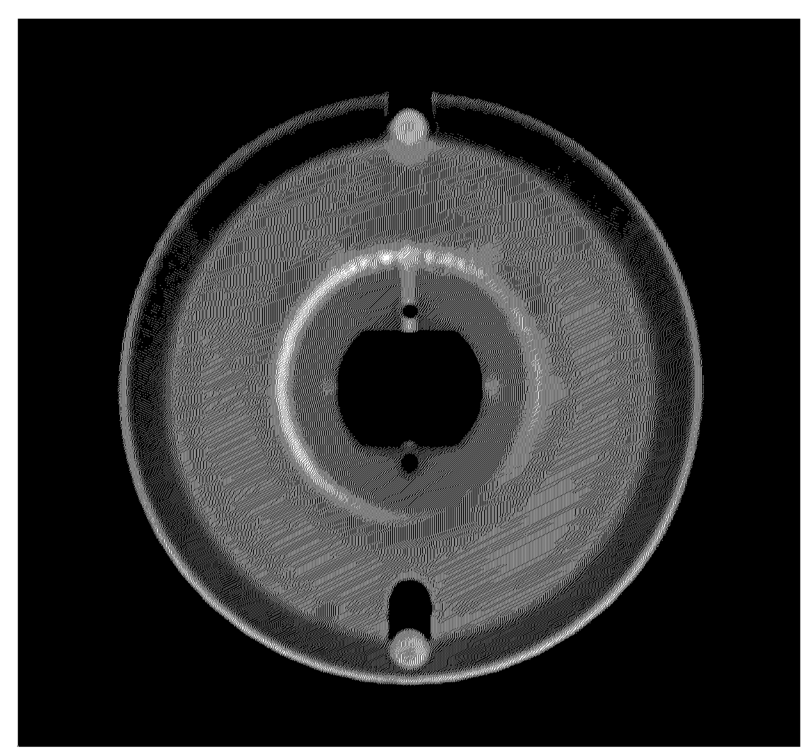
FIG. 8 shows two examples of rendered images from different perspectives that highlight data occlusions.
Figure 8:
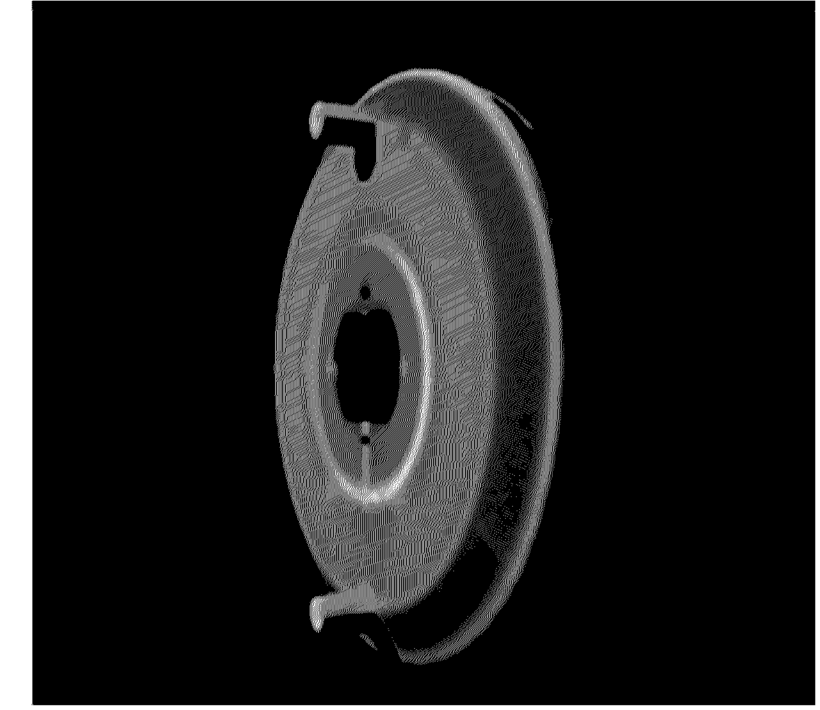

Rendering procedure 240 effectively renders a light source from the optimal pose 219 and leverages the shadow information that is provided by differences in corresponding pixel values between the current and previous depth buffers to enable or disable the rendering of texture data on the surface of the textured 3D part model 232 that is rendered from some other camera and pose 235. By way of illustration, FIG. 8 shows two rendered images that visualize the textured 3D part model 232 from different perspectives while simultaneously accounting for data occlusions.

Rendering procedure 240 can call on virtual image rendering unit 248 (or a further virtual image rendering unit) to render a virtual image 245 of the manufactured part 120 according to the input camera perspective and imaging properties 235, based on the textured 3D part model 232.

In some examples, original image 202 may be used in conjunction with textured 3D part model 232 by virtual image rendering unit 248, for example when the textured 3D part model 232 does not directly encode as facet properties the pixel texture data from the image 202, but rather encodes only vertex to pixel coordinate mapping. In some examples, access to original image 202 may not be required during later image rendering stages, for example when the textured 3D part model 232 directly encodes pixel texture data from the image 202 as facet properties. In a further example, the data from the original image 202 may be encoded into a texture image produced via texture baking operations that may also embed pre-computed shadow information.

In an example embodiment, image processing module 106 enables a set of normalized virtual images 245 to be generated that correspond to a set of original part images 202 of multiple manufactured parts 120 of the same type. These normalized virtual images 245 can enable for more accurate training of an ML model for performing an image classification task (e.g., "pass", "fail" quality inspection test), and can enable more accurate classification using a trained ML model.

The image processing module 106 procedures described above in respect of a single image from a single image sensing device 108 can be performed for each of the image sensing devices 108(1) to 108(N) to provide a respective textured 3D part model 232 (or respective additional properties to the same 3D part model 232) corresponding to the respective optimal pose determined for each of the image sensing devices 108(1) to 108(N) relative to the part 120. Furthermore, rendering procedure 240 can be used to generate a respective virtual image 245 from each of the N textured 3D part models 232 that corresponds to a common pose based on the virtual camera perspective and imaging properties 235, thereby allowing a set of normalized images of manufactured part 120 to be rendered across the set of image sensing devices 108(1) to 108(N). In some examples, multiple images can be blended together to provide a composite virtual image.

By way of overview, the procedures applied by image processing module 106 effect a rendering pipeline (which for example may be based on OpenGL™) that can be summarized as follows: (1) pose estimation procedure 210: applies a localization routine which determines the optimal pose of the part in an image using a known 3D model; (2) texture mapping procedure 230: performs a texture mapping routine which correctly maps textures to the visible and partly visible facets of the 3D model, accounting for lens artifacts (e.g., lens distortions) and geometric variations; (3) rendering procedure 240: performs a rendering routine to render arbitrary views of the textured 3D model from arbitrary virtual cameras while leveraging shadow mapping to account for data occlusions, and can include texture blending routines to appropriately blend the multiple mapped textures.

In some examples, the texture mapping provided by image processing module 106 can ensure that the image textures, captured by various types of imaging sensors (e.g., colour, monochrome, near-infrared, infrared, etc.), are accurately mapped onto the surface of the corresponding 3D model. This connects the image pixel data to the spatial 3D model data and allows for novel viewpoints of the part, as seen from a virtual camera, to be rendered. This better conditions the images for machine learning as the unwanted data variabilities (e.g., part pose variations, background variations, etc.) can be removed from the image datasets. The texture mapping is not limited to a single image and multiple images from various types of imaging sensors can be mapped as textures onto the same 3D model. Arrays of imaging sensors can be deployed with varying view-points to provide adequate part coverage to perform a reliable inspection. For example, two imaging sensor devices, each with a different viewpoint, may be required to achieve a complete inspection coverage. Both images can be mapped as textures onto the same 3D model and then rendered from a novel viewpoint to generate inspection images that are impossible to obtain from a real camera. Furthermore, the texture data from different types of imaging sensors can be used to generate respective texture layers for a common textured 3D part model 232. For example, the textured 3D part model 232 for a part 120 can include a layer corresponding to visible image data, a layer corresponding to NIR image data, and a layer corresponding to IR image data.

Figure 9:
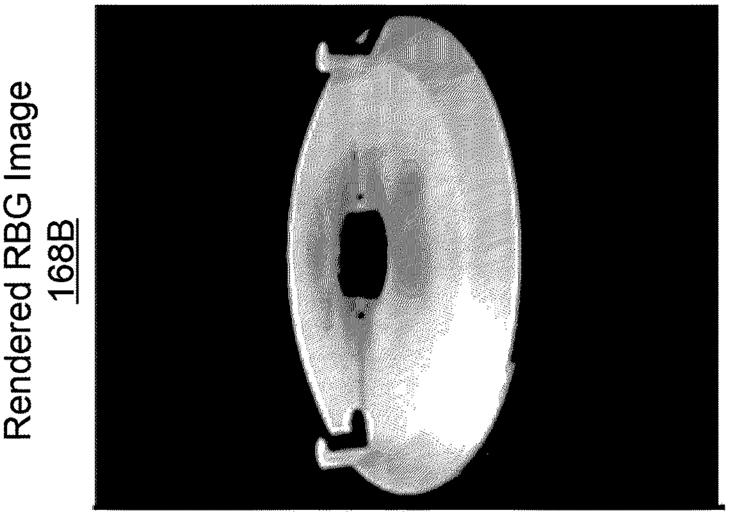
FIG. 9 shows examples of a rendered IR image, a rendered RGB image, and a corresponding blended image.
Figure 9:
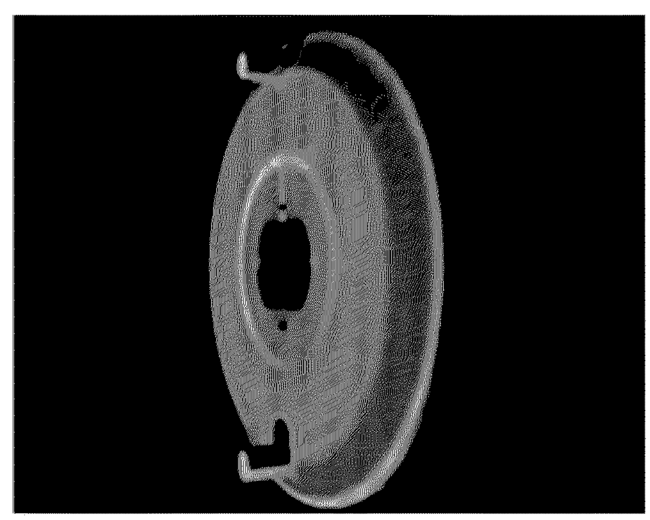

Texture blending functions can be used to combine different image types (e.g., the different texture layers) to provide new insights into part quality that may be impossible to discern when considering the images separately. By way of illustration, FIG. 9 shows an thermal image 168A rendered by a virtual thermal camera based on IR texture data properties included in a textured 3D part model, an optical image 168B rendered for the same pose by a virtual optical camera based on RGB texture data properties included in the textured 3D part model, and a blended image 168C rendered for the same pose by a virtual optical camera based on both the IR texture data properties and the RGB texture data properties.

In some applications, the mapping of images as textures onto the 3D model can address image registration problems that can result from pose variations as the corresponding pixels from the various mapped textures are all mapped to a common 3D model. This can allow for an automatic registration of various regions of interest (ROI) between the different textures, which can help to reduce labelling times and may also help to identify defects that are not easily detected at certain viewpoints. Furthermore, ROIs can be defined directly on the textured 3D model and these can be mapped back to the associated input images, providing more efficient labelling workflows.

The textured 3D model encodes a variety of additional inspection data that is not accessible through the images alone. Visualizations of this data can be rendered at any camera pose, whether that be the pose of the real camera or a virtual camera, and can be overlaid on top of existing images. For example, the additional inspection data can include: (a) Surface visibility-data that identifies the regions of the part's surface that are visible (i.e., the inspection coverage) from one or more of the deployed image sensing devices (e.g., this information is obtained through the rendering procedure 240 that accounts for data occlusions present in the facet classification data added as properties to the 3D part model); Depth map-data that identifies the corresponding depth of the part for each pixel on the part surface (e.g., this information is included in depth buffer 214A generated by pose estimation procedure 210); Surface normals-data that identifies the corresponding angles of the part surface relative to the image sensing devices for each pixel; Visible model edges-data that identifies the visible edges of the 3D model from the image sensing device pose (e.g., this information is included in the projected edge model part image 214C generated by pose estimation procedure 210).

The image and model generated by image processing module 106 can provide multiple interaction possibilities for operators that may be looking to better understand the inspection performance. For example, a current camera installation may not provide adequate inspection coverage and movement of the camera can be beneficial. Note that many other data visualizations are also possible. In some applications, the pixel size is an important consideration and this type of information can be provided for an in-depth analysis of the inspection performance. The textured 3D model contains the relevant inspection data that is mapped from the images. In many cases, it is desirable to modify the textured 3D model to remove regions that are not considered by the inspection. This can further remove irrelevant data to allow machine learning models to focus on the relevant part features. For example, clipping planes can be added to remove the selected regions of the part to generate specialized images that only show the relevant inspection data.

The 3D visualization pipeline of image processing module 106 introduces other possibilities for image augmentation. The spatial information obtained from the 3D model allows for varying inspection conditions to be synthetically generated, which can add significant robustness to the original training and inference datasets. This can include: creating novel illumination conditions by adding virtual illuminants to the rendering environment, adjusting the specifications of the virtual camera (e.g., resolution, distortion parameters, focal length, etc.), and warping the 3D model geometry.

Referring again to FIG. 1, in some examples, control module 112 is configured to receive images, for example rendered images 245 from image processing module 106. The control module 112 is configured to process the received image data and take actions based on such processing. In some examples, the actions may include classifying a target part 120 as passing or failing a quality standard. In some examples, the actions may include generating control instructions for one or more elements of industrial process 116. In some examples, the actions may include transmitting data, including image data, to configuration module 124 and/or client module 128.

In example embodiments, control module 112 is configured with one or more prediction functions Y=f(X) that are configured to estimate in real time one or more attributes of a part 120 based on the data included in one or more virtual rendered images 245, where Y indicates a predicted value and X represents the 2D array of pixel values embedded in one or more rendered images 245. In at least some examples, some or all of the prediction functions may be machine learned functions that have been learned by training a machine learning algorithm, as described in greater detail below. In some examples, some or all of the prediction functions may be regression functions that output real value attributes, and in some examples some or all of the functions may be classification functions that estimate a class attribute (e.g. fail or pass) from among a set of candidate classes.

In some examples, control module 112 is configured to take different actions based on predicted values, including for example sending a message to a further module such as a process control unit 136. Such a message may for example be a control instruction to activate a process control unit 136 to route the part 120 in either a first direction or a second direction based on whether the predicted value is a "pass" or "fail". The message may cause client module 128 to issue an alert message for an operator indicating a "failed" assessment.

In some examples, one or more of the functions implemented by control module 112 may be configured to estimate attributes that may be used to automatically adjust the industrial process. For example, one or more learned predictive functions may be configured to generate, based on one or more virtual thermal images 245, a real value attribute indicating an estimated change to a process control variable. An example of such an attribute may be "3.5 degree" for an increase in the heating temperature applied to part 120. The control module 112 can then provide a message in the form of a control instruction to a process control unit 136 to increase the heating temperature applied to future parts 120 by 3.5 degrees going forward.

As noted above, one or more of the predictive functions implemented by control module 112 may be machine learned functions that have been learned by a machine learning algorithm. As discussed below, in example embodiments configuration module 124, client module 128 and control module 112 interact with each other to collect training data, learn the predictive functions, and deploy the predictive functions to control module 112. In some examples, the processing performed by predictive functions on input thermal images is defined by a set of learned parameters W, and learning the predictive functions comprises learning parameters W at the configuration module 124 using a machine learning algorithm and training data.

Figure 10:
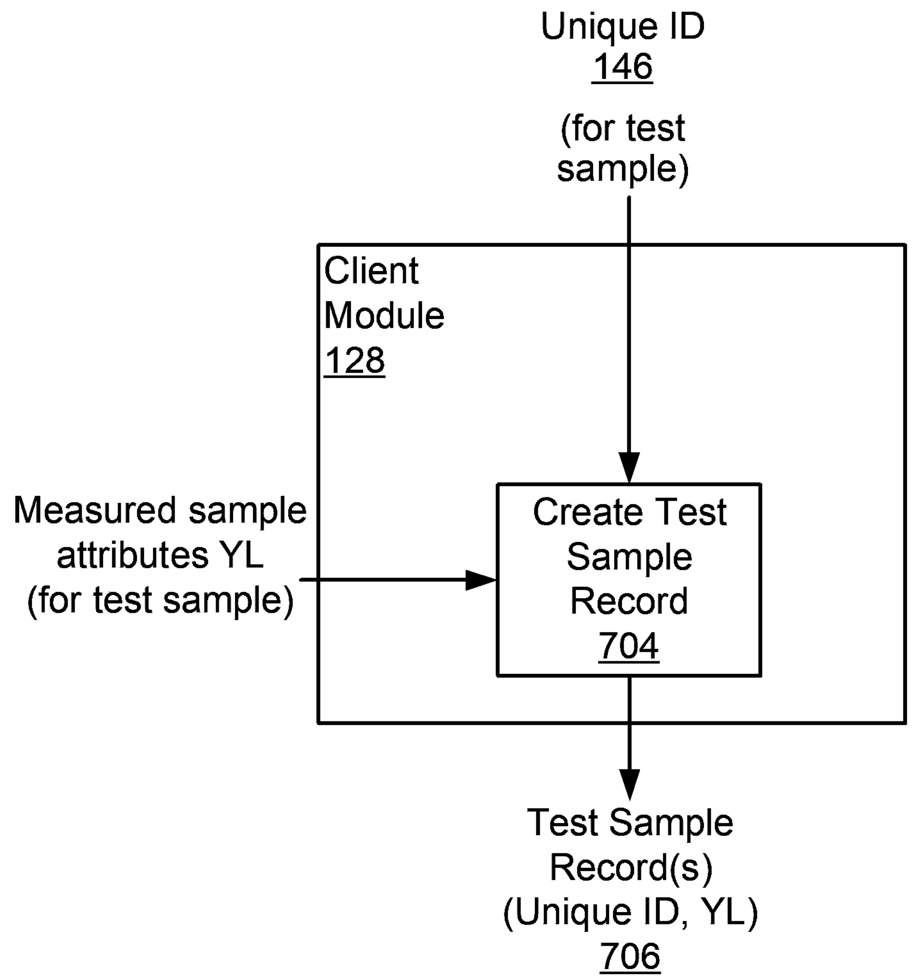
FIG. 10 is a block diagram of training sample collection operations performed by a client module of the system of FIG. 1.

According to example embodiments, training data is collected over an initial configuration period for industrial process 116. In one example embodiment, during an initial configuration period, virtual images 245 are generated by virtual image rendering unit 248 for a plurality of parts 120 over multiple manufacturing periods. In some examples, a manufacturing period is a duration of time over which process variables are assumed to be relatively constant, and may coincide with a manufacturing shift such as an 8-hour period. These virtual thermal images 245, each of which may be respectively associated with a unique part ID for part 120 (e.g. metadata for each virtual thermal image 245 may include a respective part ID), are provided to control module 112. During the initial configuration period, test sample parts 120 are selected for quality verification analysis. The test samples may be selected at different times during the manufacturing period (e.g. within the first 30 minutes and within the last 30 minutes). The test samples are subjected to physical analysis to physically measure and assign (e.g., manually) sample attributes YL, including for example $YL_{A1}$="Pass" or "Fail". In example embodiments, as illustrated in FIG. 10, client module 128 may be configured to perform the following: (1) receive unique part ID 146 for a test sample part 120 through an interface device (e.g. barcode or RFID reader); (2) receive measured sample attributes YL for test sample part 120 through an interface device (e.g. through a digital measurement device such as an electronic caliper or laser measurement device or manual operator keyboard entry); (3) as indicated by block 704, create and store test sample record 706 including unique ID and measured sample attributes YL. Accordingly, over multiple manufacturing periods, client module 128 can generate a growing set of test sample records.

In example embodiments, the test sample records 706 are communicated to configuration module 124, along with virtual images 245 to be used for training purposes. In this regard, FIG. 11 illustrates an example of operations that may be performed at configuration module 124 during an initial configuration period. As indicated by merge operation 802, in example embodiments, configuration module 124: (1) receives virtual 2D thermal images 245 (which may for example be communicated to configuration module 106 by control module 112 via a combination of networks 118 and 132); and (2) receives test sample records 706 (which may for example be communicated to configuration module 106 by client module 128 via a combination of networks 118 and 132). Merge operation 802 is configured to associate, based on unique part IDs 146, the virtual thermal images 245 generated in respect of each test sample part 120 with the test sample records 706 generated in respect of the test sample part 120 and thereby provide a training set of labeled training data 804. It will be appreciated that in some examples, merging of the virtual thermal images 245 and test sample records may be performed at a different module such as image processing module 124 or client module 128.

In at least some example embodiments, multiple similar industrial processes 116 for producing identical parts 120 may exist at a particular industrial process location or may be distributed among multiple industrial process locations. Each such industrial process 116 may be similarly configured with system modules that enable respective sets of virtual thermal images 245 and test sample records 706 to be generated in respect to each of the processes. Accordingly, in some example embodiments, the merge operation 802 of the configuration module may be configured to generate labeled training data 804 that is a compilation of virtual images 345 and test sample records 706 from multiple industrial processes 116 producing the same parts 120. It will be appreciated that this can provide an enhanced amount of labeled training data that can be used to learn prediction functions.

As indicated in FIG. 11, configuration module 124 is configured to perform a learning operation 806 to learn one or more prediction functions Y=f(X) based on labeled training data 804. As noted above, learned prediction functions Y=f(X) can be used by control module 112 to estimate one or more attributes of the parts 120 based on the pixel data included in virtual images 245. In at least some examples, learning operation 806 applies one or more machine learning algorithms to learn one or more prediction functions.

Once the prediction functions are learned, the configuration module 124 can then communicate the learned prediction functions through one or more networks 118, 132 to one or more control modules 112 so that the learned prediction functions can be applied in the manner noted above. In some examples, communicating the learned prediction functions includes sending the parameters W that have been learned in respect of the functions, thereby enabling control module 112 to implement the prediction function.

In some examples, after an initial configuration of the system 100 is performed, the prediction functions may be periodically updated. In this regard, the labeled training data 804 may be supplemented over time with new images 245 and corresponding test sample records 706, and the updated labeled training data then used by learning operation 806 to relearn the relevant prediction functions that can then be deployed to one or more control modules 112.

The quality prediction function described above is one example of many different possible prediction functions that could be learned at configuration module 124 for deployment at control modules 112 across one or more systems 100. In some examples, neural network structures could be used to implement prediction functions.

In some examples, image processing module 106 is configured to generate multiple virtual rendered image 245 realizations from each observed image 202, thus providing multiple training images for each part 120. The target attributes that are measured during quality verification analysis in respect of a single part can then be applied as training labels to the multiple virtual rendered images 245 of the respective part 120, resulting in an enlarged set of labeled training data 804.

Accordingly, the number of virtual images that can be labelled for use as training data based on actual target attribute measurements obtained from a single part 120 can be amplified. Additionally, in some examples, the additional virtual images could also be used during real-time analysis to provide additional input data to the functions implemented on control module 112.

Interactive Visualization System 1300

As noted above, in example embodiments the inspection data collection system 100 can include or call on a rendering procedure 240 to render virtual images 245 based on input virtual camera perspective and imaging properties 235. These images may for example be displayed on a display device to allow visualization of the collected data from a virtual camera perspective (e.g., generate rendered images 245 based on virtual camera perspective and imaging properties 235). In example embodiments, interactive visualization system 1300 can be connected to network 118 and integrated with inspection data collection system 100 to further enable interactive real-time visualizations of inspection data for a manufactured part 120.

As illustrated in FIG. 1, in example embodiments, the interactive visualization system 1300 can include: a display device 1306 that allows visualizations to be presented to a human operator or user 1308; a viewing perspective tracking device 1304 (hereinafter tracking device 1304); and a visualization module 1302. Each of these components will now be described in greater detail.

In the example illustrated in FIG. 12, interactive visualization system 1300 is configured to physically track a viewing perspective of a sample part 1310 and generate visualizations of inspection data corresponding to the tracked viewing perspective. The physical tracking of the viewing perspective, which may for example represent the perspective of user 1308, may occur at an inspection station 1350 that is located downstream from one or more industrial processes 116 at which inspection data (e.g., pixel data from images 202) has been collected and mapped to a 3D part model to provide one or more respective textured 3D models 232 of the manufactured part 120. In this regard, in one example the tracking device 1304 is configured to capture viewing perspective tracking data 1312 that can be provided to visualization module 1302 for processing.

In an illustrative example, the tracking device 1304 is a digital video camera that is fixed in a static position with a field of view that covers a working region of inspection station 1350 to capture data that records user 1308 physically interacting with a sample part 1310 in real-time. In such an example, the viewing perspective and tracking data 1312 takes the form of video image data that comprises successive frames of image data that capture user 1308 interactions with and manipulation of the sample part 1310. In some examples, the sample part 1310 may be the same manufactured part 120 that the one or more textured 3D models 232 have been generated in respect of. In other examples, the sample part 1310 may instead be a proxy object that can be manipulated in place of the actual manufactured part 120, enabling a user to generate a series of visualizations without actually handling the actual manufactured part 120.

The visualization module 1302 includes a pose estimation procedure 1314 that is configured to transform the viewing perspective tracking data 1312 into pose data 1318 that specifies a series of successive target part poses in a reference coordinate system. For example, the pose data 1318 can specify, in real-time, target part orientations (e.g. for example pitch, yaw and roll of the part) and location (e.g. X, Y, Z Cartesian location) within a reference coordinate system. Thus, pose data 1318 temporally maps the location and orientation of sample part 1310 as the sample part is manipulated by user 1308 within the field of view of the tracking device 1304. In example embodiments, the pose estimation procedure 1314 receives as input the 3D model 225 (described above) of the manufactured part 120 to facilitate mapping of the viewing perspective tracking data 1312 to pose data 1318. In some examples, known augmented reality tracking software solutions can be used to implement pose estimation procedure 1314, including for example solutions based on the VisionLib™ software development kit or the Vuforia™ Engine.

In some scenarios, the 3D part model 225 may not match the geometry of the actual manufactured part 1310, for example due to manufacturing variances, and the pose estimation procedure 1314 can return incorrect values. In some examples, the visualization module 1302 includes a geometry variation module 1315 to mitigate against mismatches between the actual part 1310 geometry and the part geometry data of 3D part model 225. Pose estimation procedure 1340 calls on a geometry variation module 1315, which perturbs the geometry of the 3D part model 225 so that it matches the part 1310 in the viewing perspective and tracking data 1312. Pose estimation module outputs pose 1318 and geometry variation (GV) data 1317. The geometry variation data 1317 can be represented as offsets to the vertex coordinates (e.g., reference points) of the original 3D model 225. Since the 3D part model 225 and the textured 3D part model 232 have the same geometries, the geometry variation data 1317 is applied to the textured 3D part model 232 during rendering 1316. This ensures that the rendered data in the rendered image 1320 properly aligns to the viewing perspective and tracking data 1312.

Rendering procedure 1316 is configured to receive as inputs: pose data 1318, geometry variation data 1317, textured 3D part model 232 (which includes inspection data mapped to part surfaces), tracking device properties 1326, and in at least some examples, the original viewing perspective tracking data 1312 (for example, when the original viewing perspective tracking data 1312 comprises actual video image data of the manufactured part 120). Based on such inputs, the rendering procedure 1316 (which may for example include or call a virtual imaging rendering unit 248) renders images 1320 in which visualizations of the inspection data are overlaid on a representation of the manufactured part 120. In the case where the tracking device 1304 is a digital video camera, the tracking device properties 1326 may for example be the same type of information included in the sensor device properties 226 described above. In some examples, the rendering procedure 1316 can operate in a manner similar to above described rendering procedure 240, with the exception that the virtual camera perspective and imaging properties inputs are replaced by the pose data 1318 and tracking device properties 1326. In some examples, rendering procedure 1316 can be replaced by a call to the same function used to implement rendering procedure 240.

The rendered images 1320 can be displayed on a display device 1306 for real-time viewing by the user 1308 as the user manipulates the reference part 1310, allowing the user 1308 to see the inspection data visualized from different viewing perspectives allowing for improved spatial understanding of the inspection data. In at least some examples, the inspection data included in textured 3D part model 232 correspond to amalgamated data that has been collected from different viewing perspectives by multiple sensor devices 108 such that collected data can be visualized for different viewing perspectives of the reference part 1310. For example, inspection data corresponding to a front of a manufactured part 120 is displayed when a user 1308 orientates the reference part 1310 so that a front thereof is facing the tracking device 1304, and inspection data corresponding to a back of the manufactured part 120 is displayed when a user 1308 orientates the reference part 1310 so that a back thereof is facing the tracking device 1304.

Specific rendering examples will now be described in greater detail.

In a first example, the reference part 1310 is the actual manufactured part 120 that the inspection data 1312 has been generated in respect of, and tracking device 1304 is a stationary video image camera. The textured 3D part model 232 has been generated in respect of the manufactured part 120 by a texture mapping procedure 230 of an image processing module 106 based on images 202 (inspection data) captured by one or more sensor devices 108. For example, textured 3D part model 232 may include one or more texture data layers that correspond to one or more of: near-infrared (NIR) image pixel values, infrared (IR) image pixel values, RGB visible light pixel values, Hue-Intensity-Saturation (HIS) pixel values and other EM wave pixel values as detected by respective sensor devices 108. The respective texture data layers may include values merged from different cameras to provide coverage of all or large portions of the manufactured part 120 from different physical viewing perspectives.

As the user 1308 manipulates the manufactured part 120 within the field of view of the video image camera tracking device 1304, pose estimation procedure 1314 generates real-time pose data 1318 that provides temporal pose and location data within a known spatial reference system to rendering module 1316. The rendering module 1316 also receives the actual image data (e.g., viewing perspective tracking data 1312) of the manufactured part 120. Rendering procedure 1316 maps the texture pixel values from one or more layers of the textured 3D part model 232 to the actual image data pixel values to render images that include inspection data overlaid on the actual image data from the viewing perspective and tracking data 1312. The rendered images 1320 are displayed on display device 1306. In example embodiments, the displayed layers of inspection data (e.g., NIR layer, IR, layer, visual data layer) and a transparency of such layers can be specified by user 1308.

Figure 13:
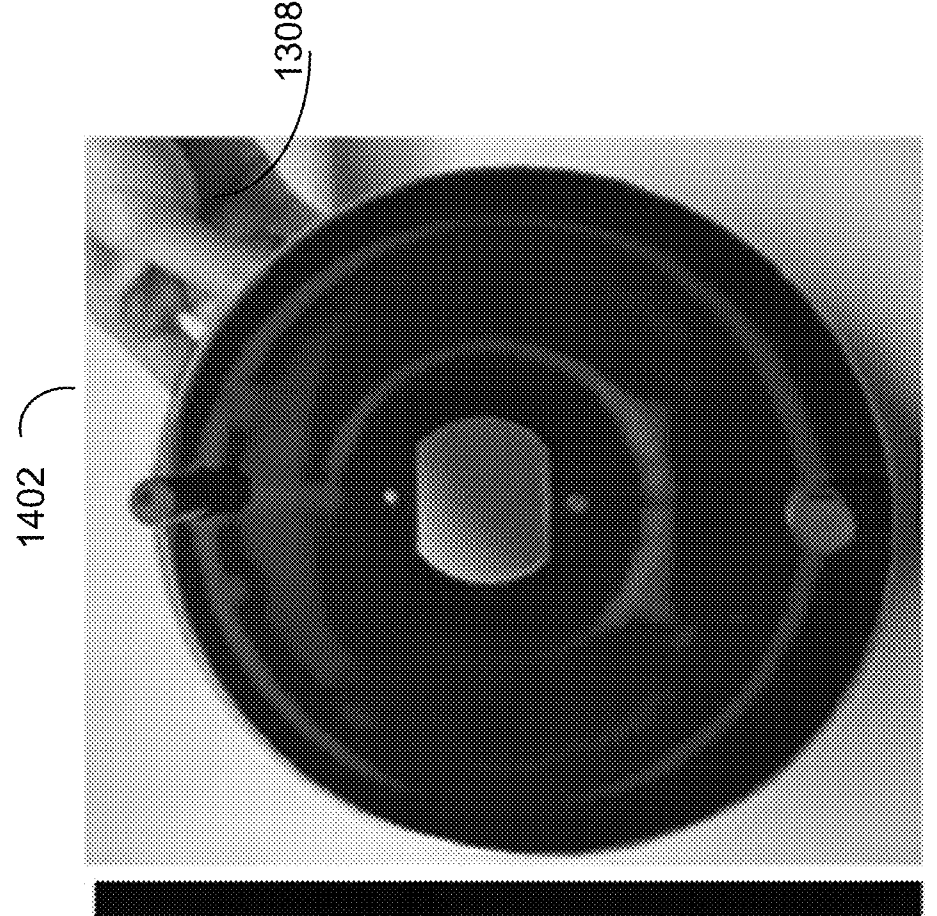
FIG. 13 shows an image depicting inspection data and an augmented image in which the inspection data is overlaid on image data.
Figure 13:
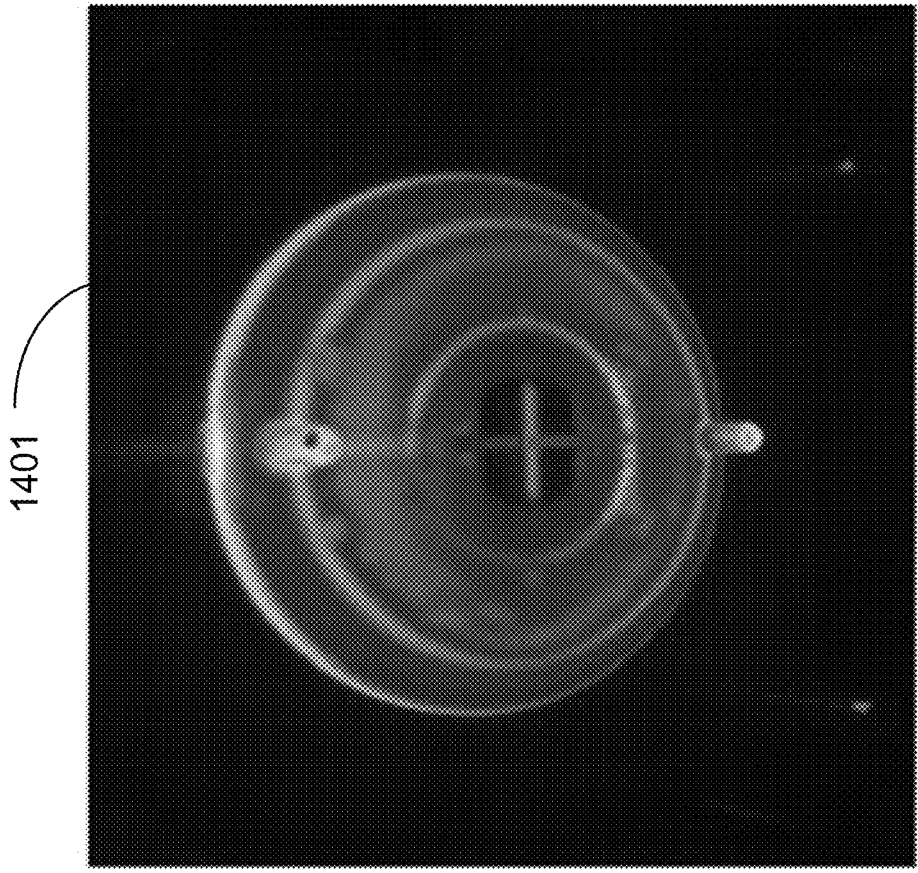

By way of example, FIG. 13 shows an example of an inspection image 1401 captured by an IR thermal camera imaging sensor device of a manufactured part 120, together with a rendered image 1402 in which an visual image of the manufactured part as it is being manipulated by a user 1308 includes a augmented reality overlay of the thermal inspection data derived from inspection image 1401. Rendered image 1402 has been generated by rendering procedure 1316.

Thus, interactive visualization system 1300 enables efficient and intuitive viewing of collected inspection data from different perspectives.

With reference to FIG. 12, in a further example, visualization module 1302 can also include an image enhancement procedure 1330 that is configured to apply real-time image processing of images rendered by rendering procedure 1316 to enable enhanced augmented visualizations. In one example, image enhancement procedure 1330 can include processing operations that are configured to highlight specific features using segmentation or region of interest (ROI) detection techniques. The highlighted features can be associated with defect locations, defect severities, anomalies, and other features. In some examples, rules-based deterministic functions and/or machine learned functions may be applied by image enhancement procedure 1330 to rendered images to segment and/or identify regions of interest that can then be overlaid onto image data included in the viewing and perspective tracking data 1312 to render augmented images for display on display device 1306.

Figure 14:
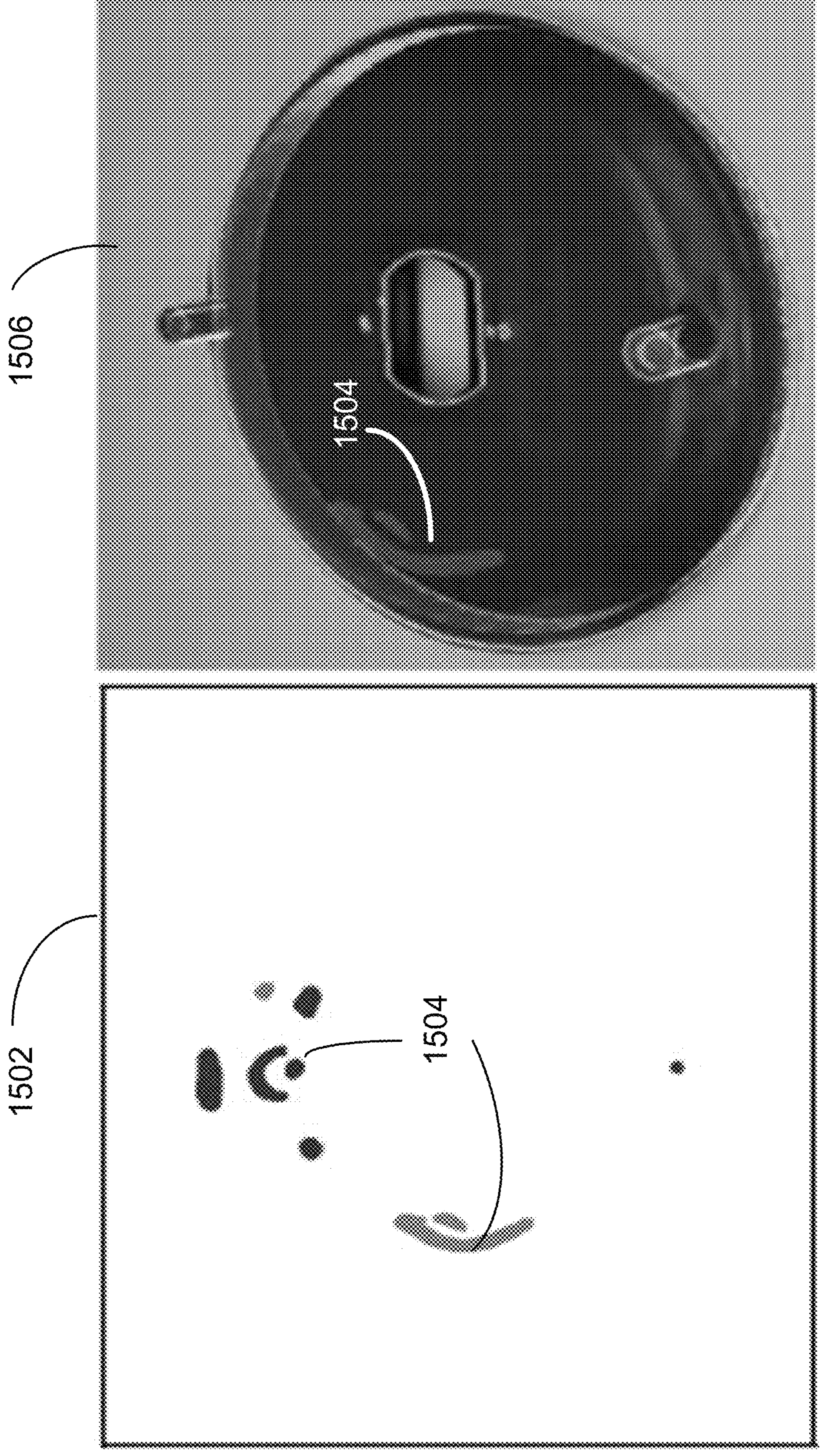
FIG. 14 shows an example of a defect segmentation image and a corresponding rendered image.

By way of example, FIG. 14 shows an example of a segmented inspection image 1502 that is generated by image enhancement procedure 1330. The image enhancement procedure receives, as input, a rendered image 1320 generated by rendering procedure 1316 that includes inspection data (for example IR image data) extracted from textured 3D part model 232 and that corresponds to a viewing perspective represented in pose data 1318. Image enhancement procedure 1330 applies a segmentation function to identify regions of interest of the manufactured part 120 based on the inspection data included in the rendered image 1320, resulting in segmented inspection image 1502 that highlights regions of interest 1504. The segmented inspection image 1502 can be returned to rendering procedure 1316 to render a further rendered image 1320 for display on display device that includes visual image data collected overlaid by the segmented region of interest data included in segmented inspection image 1502. In FIG. 14, image 1506 is an example of such an image, which includes an augmented reality overlay of the segmented inspection image 1502 over actual real-time image data of a manufactured part 120 that is captured by tracking device 1304.

Figure 15:
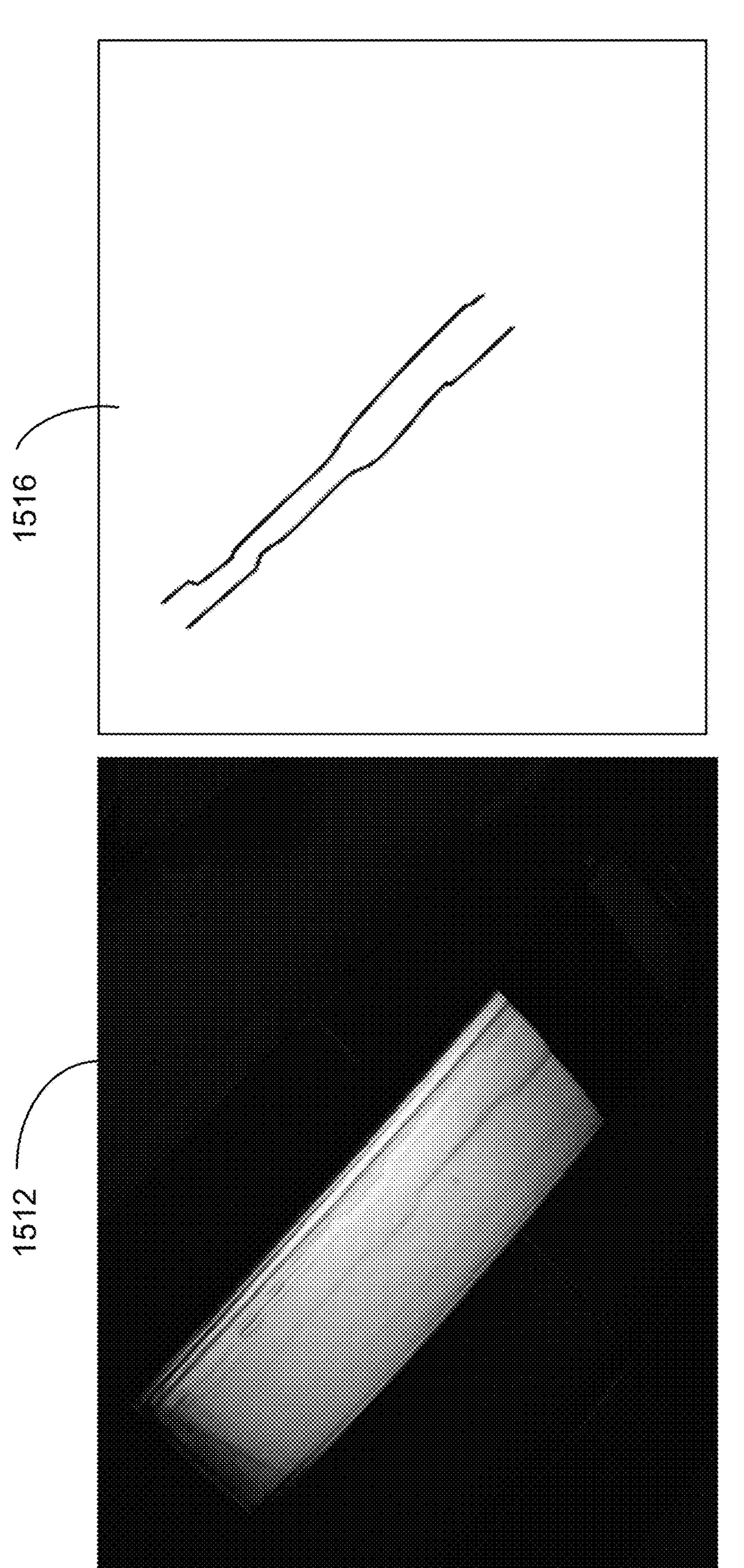
FIG. 15 shows an example of an inspection image and a defect segmentation image for a part.

FIG. 15 shows an example of an inspection image 1512 and a corresponding segmented inspection image 1516.

Figure 16:
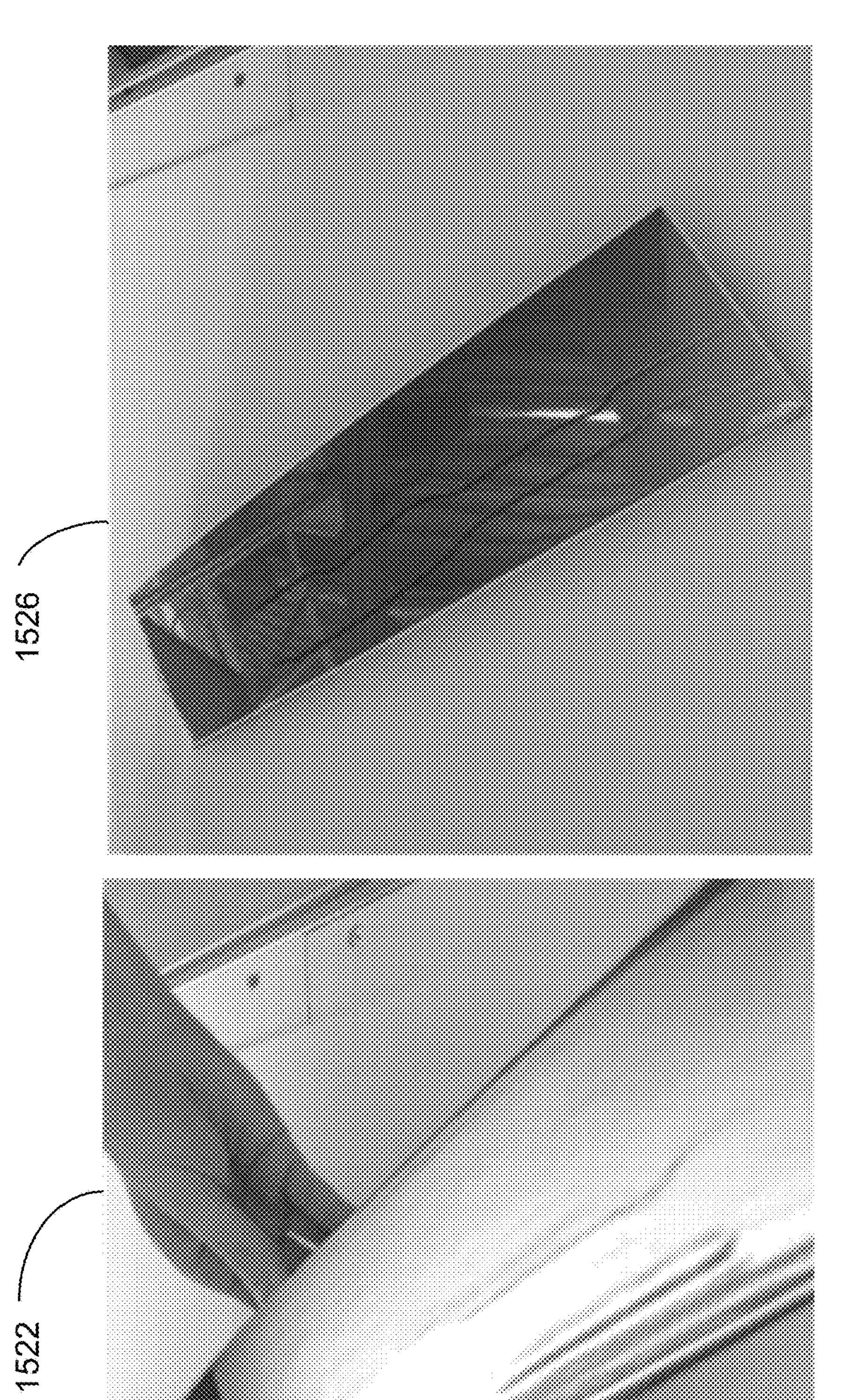
FIG. 16 shows an example of an interactive visualization image with an inspection image overlaid and an interactive visualization image with a defect segmentation image overlaid.

FIG. 16 shows an example of an interactive visualization image with inspection image overlaid 1522 (with user), and an interactive visualization image with segmented image overlaid 1526.

In some examples, the image enhancement procedure 1330 is applied to the textured 3D part model 232 prior to the rendering procedure 1316. In such examples, the image enhancement can be applied directly to the inspection data image 202 or rendered image 245 as a pre-processing step for the interactive visualization system 1300. The rendering procedure 1316 then assigns the enhanced image data as texture data during rendering.

As noted above, in some examples the image enhancement procedure 1330 may apply a machine learned function. For example, a prediction function may be configured to receive as input a rendered image 1320 that has been rendered by rendering procedure 1316 based on the IR layer pixel values of a textured 3D part model 232 and that corresponds to a viewing perspective specified by pose data 1318. The prediction function generates a respective image having a corresponding set of pixel values in which each pixel is assigned a respective color value indicating a pass or fail classification, with a fail classification (e.g., as represented by a dark color value) indicating that a pixel corresponds to a region where a defect is predicted and a pass classification (e.g., as represented by a transparent color value) indicating that the pixel corresponds to a region where no defect is predicted.

In a further example, the image enhancement procedure 1330 can be configured to predict specific characteristics of a part 120 based on the inspection data included in the textured 3D part model 232 corresponding to the part, as well as based on sensed process parameters. For example, sensors (e.g., temperature sensors, pressure sensors, speed sensors) can measure process parameters of the process 116 while the part 120 is being produced. That process data, and a rendered image 1320 that represents one or more layers of captured image inspection data, can be input to a machine learning prediction function that is trained to predict a specific characteristic (e.g., plastic weld thickness, subsurface defect, etc.). The predicted characteristic can be returned to rendering procedure 1316, which can then generate a rendered image 1320 in which the predicted characteristic is overlaid with on image data (for example, a predicted weld thickness value (e.g., 5 mm) is overlaid on image data that corresponds to the locations of the weld.

It will be appreciated that the rendered images 1320 that are rendered by the visualization module 1302 can include images of different types of data or combinations of different types of data. For example, rendering procedure 1316 can output rendered images 1320 that include one or more of: (1) captured inspection data 1332, which can include one or more types of image data that has been mapped to textured 3D part model; (2) processed image data 1334 that can visualizations to highlight specific features through segmentation or region of interest visualizations; and (3) generated image data 1336, which may for example include text or other visualization markers that indicates a specific characteristic that has been predicted in respect of the part 120. In the rendered images 1320, the different types of data can be overlaid on real-time data collected by tracking device 1304.

In a further second example, the reference part 1310 that is manipulated by user 1308 at inspection station 1350 is not the actual manufactured part 120 that the inspection data has been collected in respect of, but rather is a proxy object that may or may not be identical in size and shape to the manufactured part 120. The tracking device 1304 is a video image camera. Such an example can operate in a similar manner to examples described above, with images that visualize collected data 1301 being rendered based on user manipulation of the reference part 1310. However, in such cases the video images collected by tracking device 1304 may be omitted from the rendered images 1320 as irrelevant. Rather, image data from a respective textured 3D model with mapped pixel image data collected by an optical image capture device 110 at industrial process 116 may be used for an image data layer of the manufactured part 120.

In a third example, a display device 1306 and tracking device 1304 are integrated into a head mounted device (HMD) that is worn by user 1308, and the tracking device 1304 includes an inertial momentum unit (IMU) 1328 that tracks movement of the user's head. The viewing and perspective data 1312 includes pose and location information generated by the IMU 1328, and the pose estimation 1314 translates that data into pose data 1318. Such an example can enable a user 1308 to interact with a manufactured part 120 without physically handling the part, which may be useful for large parts, fragile parts, or hazardous parts, for example. In some examples, the interactive visualization system 1300 can include both stationary and HMD display devices 1306 and tracking devices 1304.

In some examples, one or both of the display device 1306 and tracking device 1304 are integrated into a handheld device. By way of example, a smartphone can be provisioned with a software application that configures an integrated smartphone camera and IMU to generate viewing perspective and tracking data 1312, and use the smartphone display to implement display device 1306. In some examples the handheld device and visualization module can be configured to exchange wireless data with each other through a network that includes a wireless local area network. In some examples, some or all of the features of visualization module 1302 may also be implemented on the handheld device.

Accordingly, different hardware configurations can be used for tracking device 1304 and display device 1306 of the interactive visualization system 1300, including configurations that include one or more of: (A) augmented/mixed reality headset—an augmented/mixed reality headset consisting of a head-mounted digital display and camera(s) (e.g., Microsoft Hololens) that overlays computer-generated (rendered) data over the physical world; (B) mobile device—a mobile device (e.g., phone, tablet, laptop, etc.) consisting of a digital display and connected camera that overlays computer-generated data over the captured image and displays the resulting image on the device's display; (C) camera and digital display—a separate camera and digital display (e.g., a camera above a conveyor and a corresponding HMI digital display) that overlays computer-generated data over the captured image and displays the resulting image on the display; and (D) camera and digital projector—a separate camera and digital projection system that projects computer-generated data over the real physical world.

Figure 17:
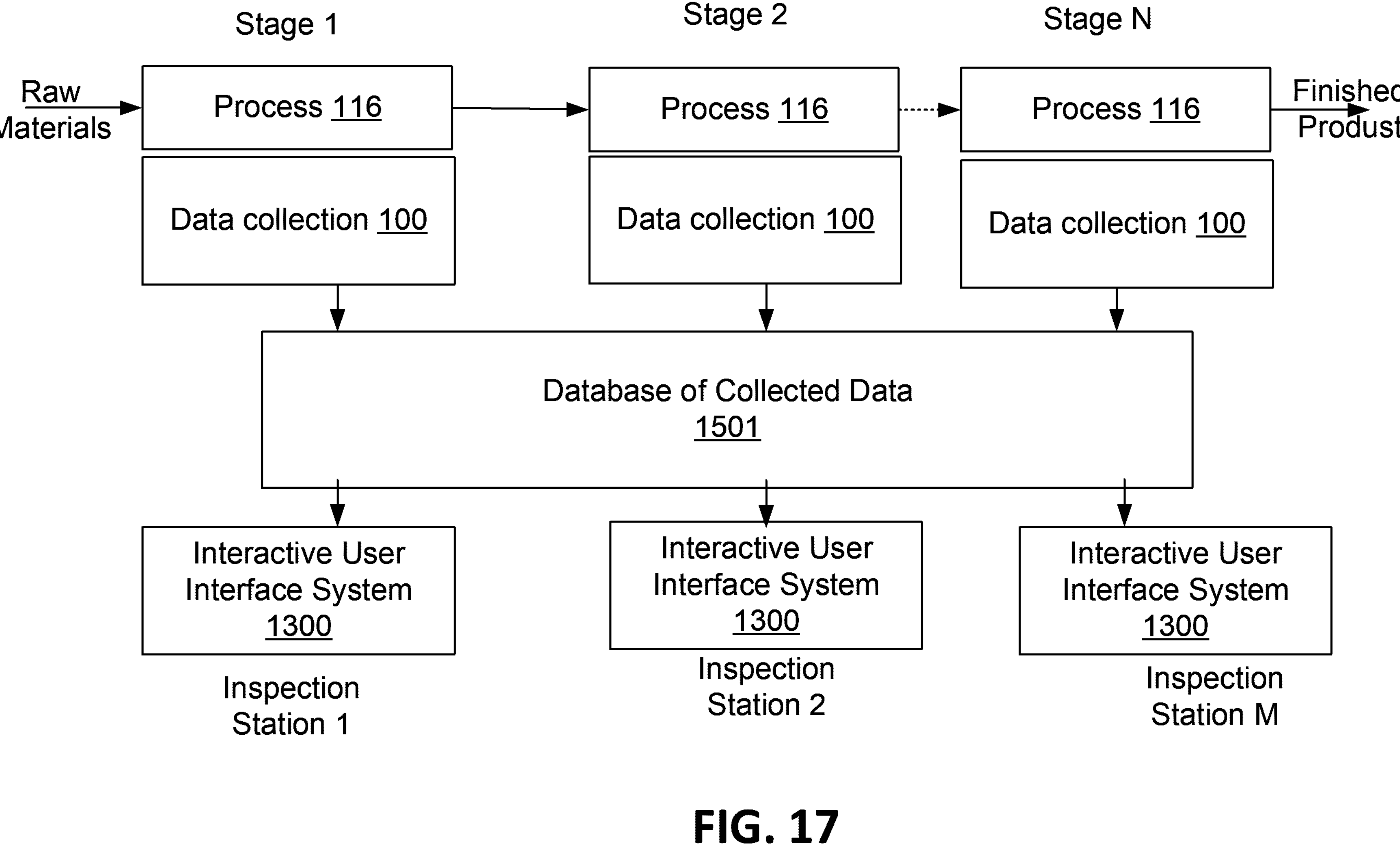
FIG. 17 is a block diagram of a system for collection and visualization of inspection data for a multi-stage manufacturing application.

In some examples, one or more interactive user interface systems 1300 having associated inspection stations 1350 can be set up to receive inspection data 1301 generated by a plurality of data collection systems 100 in respect of multiple industrial processes 116, as illustrated for example in FIG. 17. In such examples, the inspection data generated by each data collection system 100 in respect of a respective manufacturing process 116 (which may for example be successive stages in a larger process) can be collected at a common database of collected data 1501. Further, the data generated at each industrial process 116 can be visualized at each one of a plurality of interactive user interface systems 1300. In at least some examples, some or all of the functionality of image processing module 106 for each of the stages can be centralized at a centralized shared computer system central computer system from sensing devices that are distributed at respective industrial processes e.g. respective stages). Similarly, some or all of the functionality of image visualization module 1302 for each of a plurality of inspection stations can be centralized at a centralized shared computer system.

In the example of FIG. 17, a sequential transformation from raw materials to end product occurs through N stages. Each stage can collect image and machine sensor data that can be communicated to common database 1501, where appropriate textured 3D models and other data can be generated and distributed to each of the M inspection/visualization stations.

In some examples, the finished product may be the combined assembly of a plurality of component parts that are produced at different stages and then combined at still further stages. In such an example, the interactive visualization system 1300 may be further configured to enable a user 1308 to selectively view visualizations of data corresponding to the manufacture of component parts of an assembled part. For example, user 1308 may be able to make predefined hand motions that are detected by tracking device 1304 that correspond to separating component parts of an assembled part, enabling the user to cause the interactive visualization system 1300 to generate sectional views based on 3D model data generated at different process stages.

As an example, consider a typical automotive manufacturing application where plastic parts are first produced by an injection molding machine and thermal cameras capture thermal inspection images of the molded parts. Next, the plastic parts are sent to a hot plate welding machine and thermal cameras capture thermal inspection images of the heated surfaces of the parts prior to welding. Then, the cooled parts are painted and color cameras capture inspection images or videos of the part under specific illumination conditions that highlight surface defects. Finally, the parts are installed into the assembly. In this typical application, the inspection data for a particular part is incrementally captured and the linked inspection data from the various manufacturing stages can be incorporated as respective layers of a textured 3D model of the part. The textured 3D model can be processed using interactive visualization system 1300 to improve the quality insights and present these insights to the operators using rendered visualizations and other reporting methods that are appropriately displayed at the corresponding inspection/visualization stations.

From the above description it will be appreciated that the interactive visualization system 1300 can be used for Augmented/Mixed Reality applications in which captured inspection data 1332, processed data 1334 and/or generated data 1336, can be visualized based on tracking data collected in respect of a reference part. In some applications, the inspection data 1332, processed data 1334 and/or generated data 1336 can be overlaid on actual real-time image data (included in the tracking data) of the reference part. In some example applications, the reference part is the actual manufactured part that the inspection data has been collected in respect of. In some applications, the reference part is an arbitrary part or object that represents the actual manufactured part. In some applications, the representative reference part can be a replica (e.g., template object) of the actual manufactured part.

In some alternative applications, the reference part 1310 may be a virtual object that is displayed on a display screen of a computer device, with the user 1308 manipulating the object pose through an input device (e.g., keyboard, mouse, joystick, etc.) that is connected to the computer device. In such cases the tracking device 1304 may include a software enabled module that generates viewing perspective tracking data 1312 based on user interactions with the virtual reference part 1310 via the input device.

In some applications, a part 120 can be a component of a larger assembly of parts, with the part either being visible from the exterior of the assembly or hidden from external view within the assembly. In the case of hidden parts/part surfaces, images can be rendered that overlay the inspection data for hidden surfaces onto the appropriate location of the rendered image.

In example applications, real-time part tracking enabled by interactive visualization system 1300 allows the user 1308 to interact with the reference part 1302 and intuitively engage with the inspection data, providing a wide range of data interaction opportunities. These interactions may include for example:

1. In/post-process viewing of inspection data overlaid on a physical part, such that: the image data from one or more captured, processed, or generated image textures are rendered over the physical part, including appropriate texture blending functions. The user can interact with a physical reference part to change the user's perspective of the inspection data by repositioning and reorienting the part or camera.
2. In/post-process viewing of inspection data overlaid on a physical part in a larger assembly, such that: the image data from one or more captured, processed, or generated image textures are rendered over the physical part that is included in a larger assembly, including appropriate texture blending functions. The user can interact with the assembly to change the user's perspective of the inspection data by repositioning and reorienting the part or camera
3. Communicating regions of interest (ROIs) on a uniquely tracked part to the user/operator for additional inspection, destructive testing, etc, such that: the locations of ROIs identified by processing the captured image, rendered image, and/or further sensor data visualized during rendering to communicate and track the placements of potential defects, anomalies, etc. The user can interact with the reference part to inspect/reinspect the quality of the part at the ROIs.
4. Physical or virtual labelling of defects on a uniquely tracked part using a tracked labelling tool and mapping these defects to the inspection data images, such that: A physical labelling tool, whose position and orientation are tracked, is utilized by an operator/user to physically label defects on the surface of the part in online or offline environments. For example, an operator may physically draw an ROI on the surface of the part using a physical labelling tool and assign an appropriate defect label. Alternatively, defects can be digitally labelled. For example, an operator can be presented with a virtual reality visualization of the textured 3D model that can be digitally labelled using a user input device such as a mouse.

The defect labels and ROIs identified may be mapped to all overlapping texture layers of the textured 3D-model as appropriate. This labelling workflow minimizes the user input requirements for labelling. A single label can be extended to all associated texture layers simultaneously. Furthermore, predicted defects and ROIs can also be extended to all associated texture layers simultaneously.

5. Leveraging a reference part or a template object to visualize inspection data offline or offsite, such that: a reference part is used to visualize and interact with the inspection data obtained for another part. A template object, whose geometry is designed to be easily trackable, is used to visualize and interact with the inspection data obtained for another part.

Example Processing Unit

Figure 18:
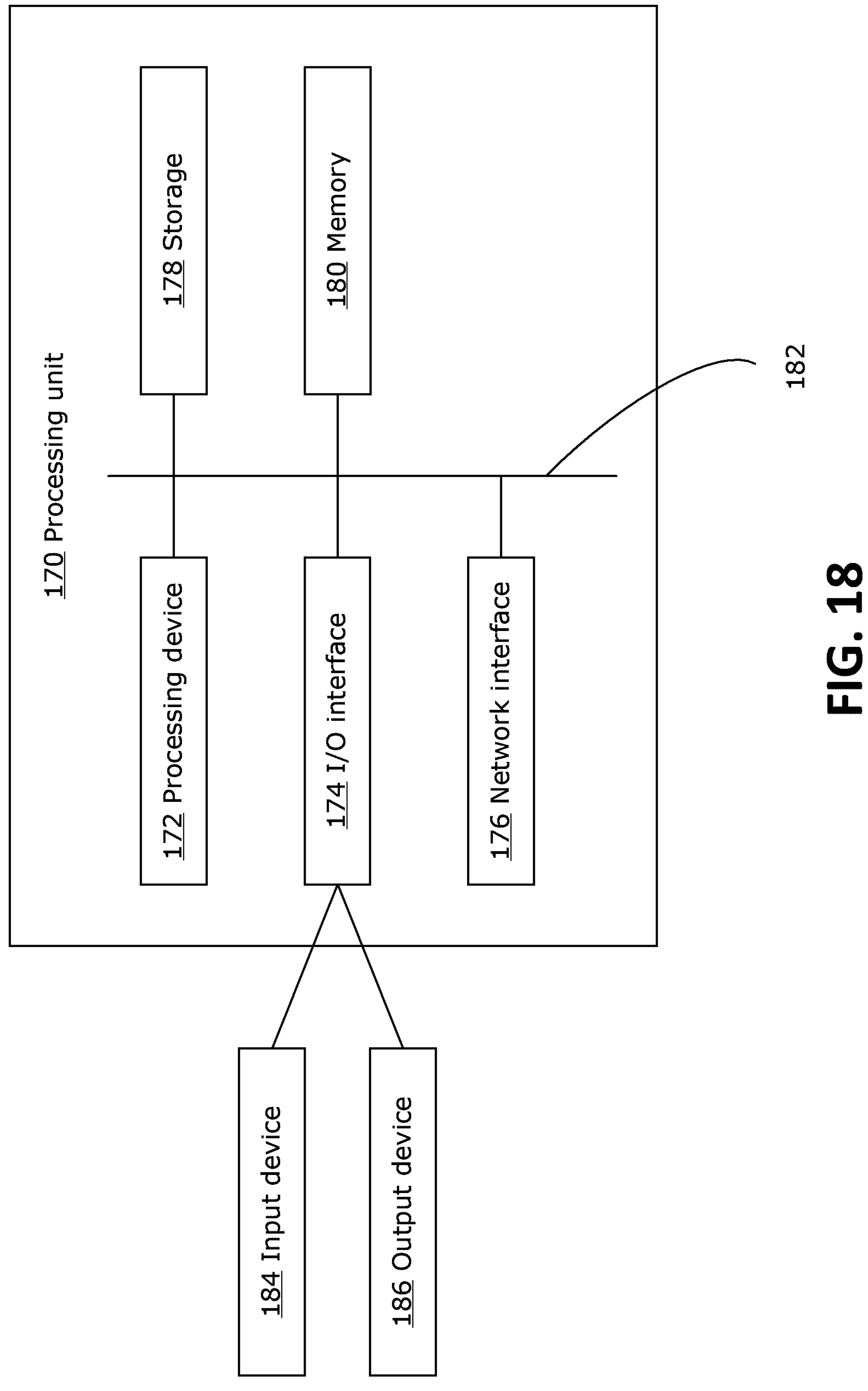
FIG. 18 is a block diagram of a processing unit that can be used to implement modules and units of the system of FIG. 1 according to example embodiments.

FIG. 18 is a block diagram of an example processing unit 170, which may be used to implement one or more of the modules, units or procedures of systems 100 and 1300. Processing unit 170 may be used in a computer device to execute machine executable instructions that implement one or more of the modules or parts of the modules of systems 100 and 1300. Other processing units suitable for implementing embodiments described in the present disclosure may be used, which may include parts different from those discussed below. Although the Figure shows a single instance of each part, there may be multiple instances of each part in the processing unit 170.

The processing unit 170 may include one or more processing devices 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g with networks 118 or 132).

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among parts of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various parts for performing at least some of the aspects and features of the described methods, be it by way of hardware parts, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/parts, the systems, devices and assemblies could be modified to include additional or fewer of such elements/parts. For example, although any of the elements/parts disclosed may be referenced as being singular, the embodiments disclosed herein could be modified to include a plurality of such elements/parts. The subject matter described herein intends to cover and embrace all suitable changes in technology.

The content of any publications identified in this disclosure are incorporated herein by reference.

The invention claimed is:

1. A computer implemented method comprising:

collecting inspection image data of a part for an industrial process associated with producing the part;

generating a 3D textured model of the part that includes inspection data collected for the industrial process associated with producing the part by mapping texture data included in the inspection image data to a 3D model of the part;

tracking a viewing perspective of a user relative to a reference part;

generating pose data based on the tracked viewing perspective;

rendering an image that includes inspection data from the 3D textured model based on the pose data;

processing the rendered image using segmentation or region-of-interest (ROI) detection based on the inspection data included in the rendered image to identify one or more regions of interest of the part;

generating a segmented inspection image that highlights the one or more identified regions of interest; and rendering a further image for display that includes image data corresponding to the reference part overlaid with the segmented inspection image.

2. The computer implemented method of claim 1 wherein the tracking comprises receiving video image data that includes successive images of the reference part, generating the pose data comprises mapping, based on the video image data, physical locations and orientations of the reference part to a reference coordinate system that enables the inspection data from the 3D textured model to be mapped to the reference part over the successive images, and the rendering comprises successively rendering images that correspond to the successive images of the reference part.

3. The method of claim 2 wherein the reference part is a physical part having an actual geometry that may vary relative to geometry data of the 3D textured model of the part, and the method further comprises determining geometry variation data that enables the geometry data for the 3D textured model to be conformed to the actual geometry of the reference part, wherein successively rendering the images compromises is based on both the pose data and the geometry variation data.

4. The method of claim 3 wherein determining the geometry variation data comprises perturbing 3D model geometry data to determine offsets for a plurality of reference points of the 3D model geometry data to corresponding points of the reference part.

5. The method of claim 2 wherein the inspection data includes texture data corresponding to one or more of: near-infrared (NIR) image data, infrared (IR) image data, and/or visible light image data, wherein rendering the images comprises overlaying the texture data on the successive images of the reference part to provide augmented images.

6. The method of claim 2 comprising processing the inspection data collected for the industrial process associated with producing the part to visually enhance features of interest in the rendered images.

7. The method of claim 6 wherein processing the inspection data comprises using a machine learned prediction function to generate classification data for one or more regions of the part based on the inspection data, the classification data being overlaid on a representation of the part in the rendered images.

8. The method of claim 1 comprising receiving a user input selecting a region of the reference part, the rendering comprising displaying an indication of the user input.

9. The method of claim 1 wherein the inspection data includes inspection data collected from multiple industrial processes associated with producing the part, the method comprising selectively including, in the rendered image, the inspection data collected from different industrial processes, based on detected user inputs.

10. The method of claim 1 wherein:

(i) the tracking and the rendering uses one or more of an augmented/mixed reality headset including a head-mounted digital display and camera; (ii) the tracking and the rendering uses a mobile device including a digital display and connected camera; (iii) the tracking and the rendering uses a separate camera and digital display; or (iv) the tracking and the rendering uses a camera and digital projector; and the rendering comprises overlaying computer-generated data derived from the inspection data over physical world images of the reference part.

11. The method of claim 1 wherein the reference part is the same physical part as the part.

12. The method of claim 1 wherein the reference part is a proxy object for the part.

13. An interactive inspection system comprising:

an inspection device configured to collect inspection image data of a part for an industrial process associated with producing the part;

a model generation module configured to generate a 3D textured model of the part that includes inspection data collected for the industrial process associated with producing the part by mapping texture data included in the inspection image data to a 3D model of the part;

a tracking device configured for tracking a viewing perspective of a user relative to a reference part;

a computer implemented pose estimator configured for generating pose data indicating a pose of the reference part in reliance on the tracked viewing perspective;

a computer implemented rendering unit configured for generating a rendered image of the part based on the pose data, the rendered image including inspection data from the 3D textured model;

an image enhancement module configured to process the rendered image using segmentation or region-of-interest (ROI) detection based on the inspection data included in the rendered image to identify one or more regions of interest of the part, and to generate a segmented inspection image that highlights the one or more identified regions of interest; and a display device configured to display a further image that includes image data corresponding to the reference part overlaid with the segmented inspection image.

14. The interactive inspection system of claim 13 wherein:

the tracking device includes a camera receiving video image data that includes successive images of the reference part;

the pose estimator generates the pose data by mapping, based on the video image data, physical locations and orientations of the reference part over the successive images to a reference coordinate system; and the rendering unit maps inspection data from the 3D textured model to the reference part over the successive images based on the pose data and generates successive corresponding rendered images including the mapped inspection data.

15. The interactive inspection system of claim 14 wherein the reference part is a physical part having an actual geometry that varies relative to geometry data of the 3D textured model of the part, and the system further includes a geometry variation module configured to compute geometry variation data that enables the geometry data for the 3D textured model to be conformed to the actual geometry of the reference part, wherein the rendered images are generated by the rendering unit based on both the pose data and the geometry variation data.

16. The interactive inspection system of claim 15 wherein the geometry variation module is configured to compute the geometry variation data using a process that includes perturbing 3D model geometry data to determine offsets for a plurality of reference points of the 3D model geometry data to corresponding points of the reference part.

17. The interactive inspection system of claim 14 wherein the inspection data includes texture data corresponding to one or more of: near-infrared (NIR) image data, infrared (IR) image data, and/or visible light image data, wherein the rendered images are augmented with the texture data overlaid on the successive images of the reference part.

18. The interactive inspection system of claim 14 further comprising an image enhancer associated with the rendering unit, the image enhancer configured to process the inspection data collected for the industrial process associated with producing the part to visually enhance features of interest in the rendered images.

19. The interactive inspection system of claim 18 wherein the image enhancer includes a machine learned prediction function for generating classification data for one or more regions of the part based on the inspection data, the classification data being overlaid on a representation of the part in the rendered images.

20. The interactive inspection system of claim 13 wherein:

(i) the tracking device and the display device are implemented using an augmented reality headset that includes a head-mounted digital display and camera;

(ii) the tracking device and the display device are implemented using mobile device that includes a digital display and connected camera;

(iii) the tracking device and the display device comprise a separate camera and digital display, respectively; or (iv) the tracking device and the display device comprise a camera and digital projector, respectively;

and the rendered image comprises a computer-generated data derived from the inspection data overlaid onto a physical world images of the reference part.

* * * * *